June 27, 1950     C. E. ADAMS     2,512,730
CONTROL VALVE MECHANISM FOR HYDRAULIC APPARATUS
Filed May 21, 1945     11 Sheets-Sheet 1

INVENTOR.
Cecil E. Adams
BY
Herschel C. Omohundro
ATTORNEY

June 27, 1950
C. E. ADAMS
2,512,730
CONTROL VALVE MECHANISM FOR HYDRAULIC APPARATUS
Filed May 21, 1945
11 Sheets-Sheet 2
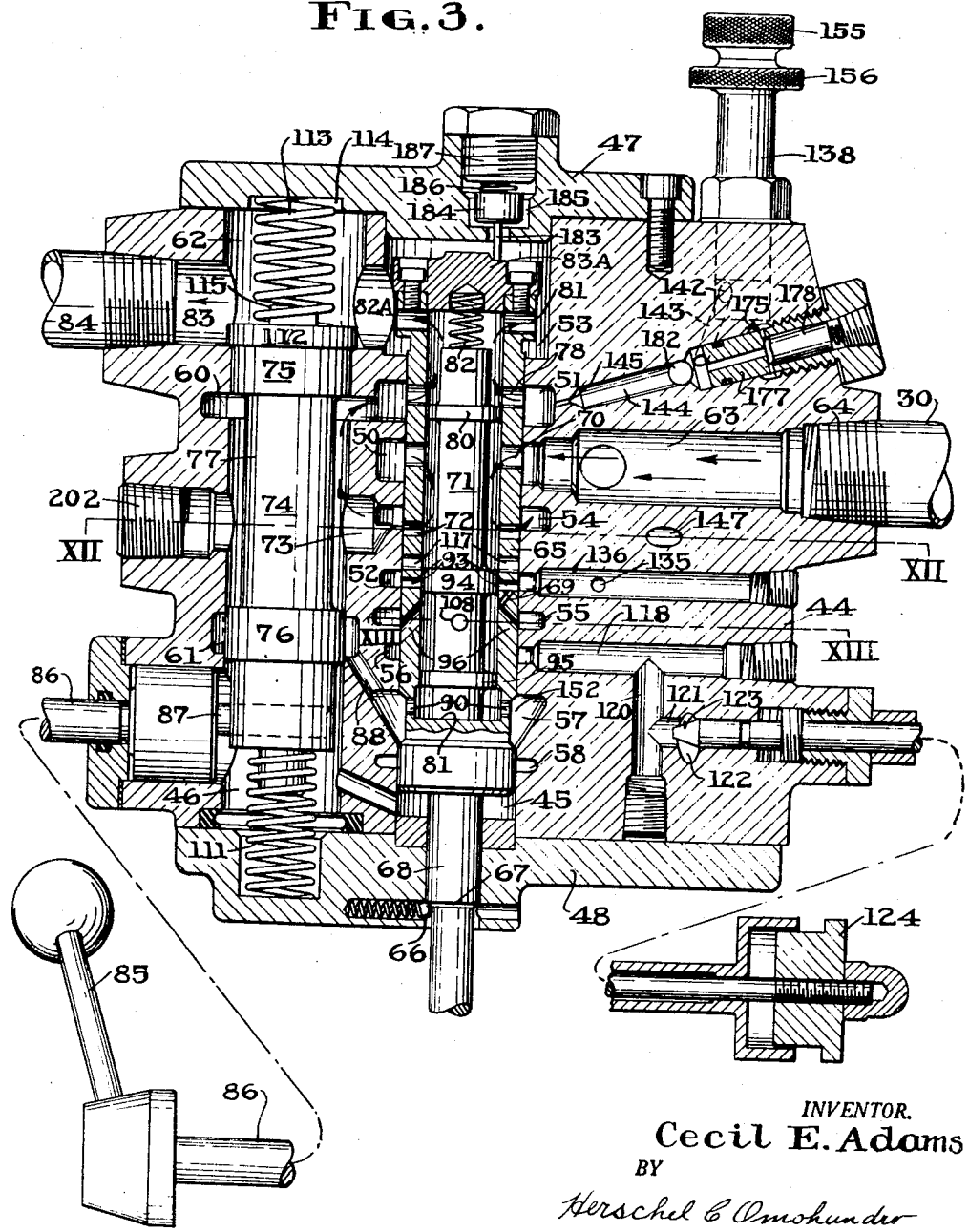
INVENTOR.
Cecil E. Adams
BY
Herschel C Omohundro
ATTORNEY June 27, 1950  C. E. ADAMS  2,512,730
CONTROL VALVE MECHANISM FOR HYDRAULIC APPARATUS
Filed May 21, 1945  11 Sheets-Sheet 3

INVENTOR.
Cecil E. Adams
BY
Herschel C. Omohundro
ATTORNEY

June 27, 1950 C. E. ADAMS 2,512,730
CONTROL VALVE MECHANISM FOR HYDRAULIC APPARATUS
Filed May 21, 1945 11 Sheets-Sheet 4
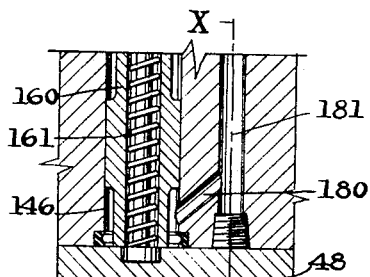
FIG. 9.
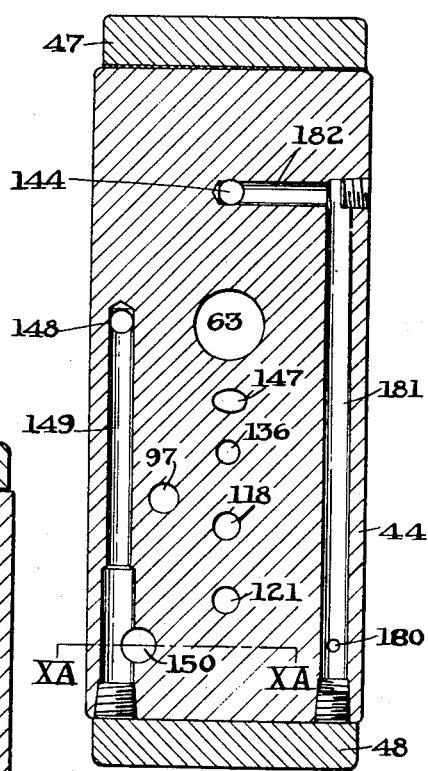
FIG. 10.
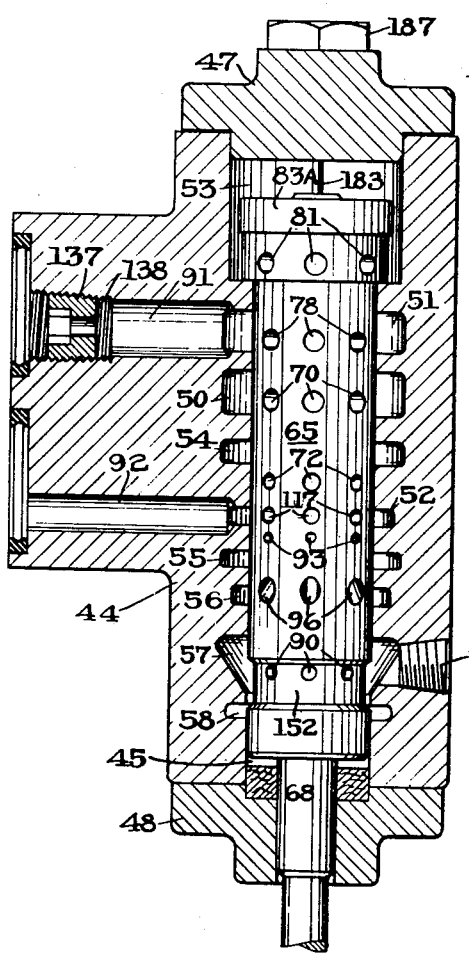
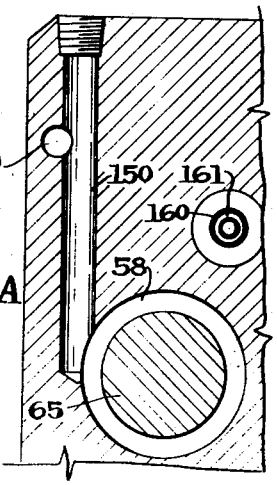
FIG. 11.
FIG. 10A
INVENTOR.
Cecil E. Adams
BY
Herschel C Omohundro
ATTORNEY June 27, 1950 C. E. ADAMS 2,512,730
CONTROL VALVE MECHANISM FOR HYDRAULIC APPARATUS
Filed May 21, 1945 11 Sheets-Sheet 5

INVENTOR.
Cecil E. Adams
BY
Herschel C. Omohundro
ATTORNEY

June 27, 1950 C. E. ADAMS 2,512,730
CONTROL VALVE MECHANISM FOR HYDRAULIC APPARATUS
Filed May 21, 1945 11 Sheets-Sheet 6

INVENTOR.
Cecil E. Adams
BY
Herschel C. Omohundro
ATTORNEY

June 27, 1950 C. E. ADAMS 2,512,730
CONTROL VALVE MECHANISM FOR HYDRAULIC APPARATUS
Filed May 21, 1945 11 Sheets-Sheet 7
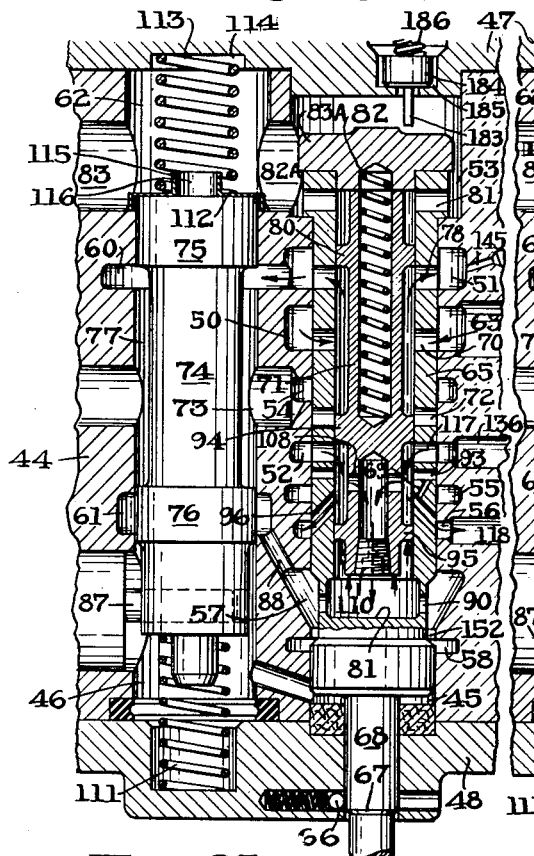
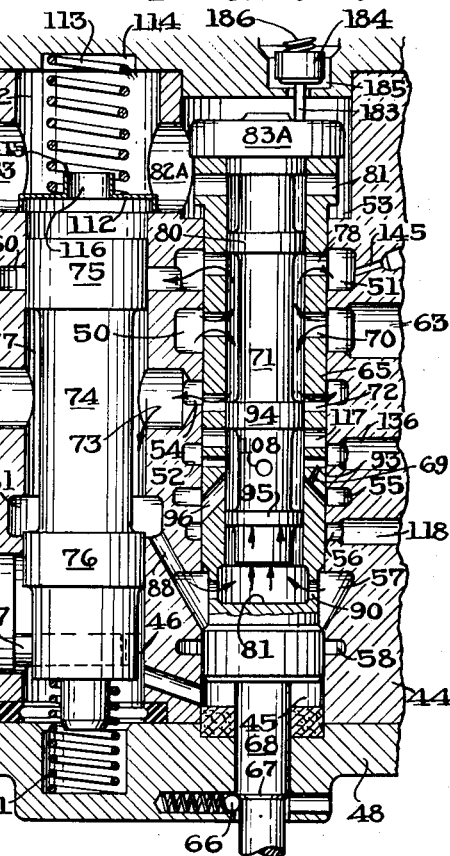
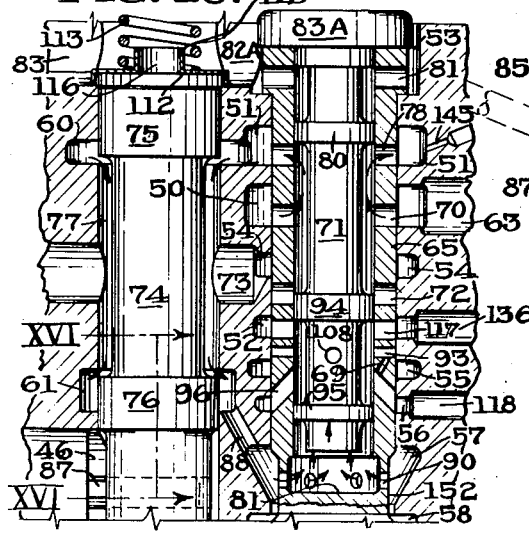
INVENTOR.
Cecil E. Adams
BY
Herschel C. Omohundro
ATTORNEY June 27, 1950

C. E. ADAMS 2,512,730

CONTROL VALVE MECHANISM FOR HYDRAULIC APPARATUS

Filed May 21, 1945

INVENTOR.
Cecil E. Adams
BY
Herschel C. Omohundro
ATTORNEY

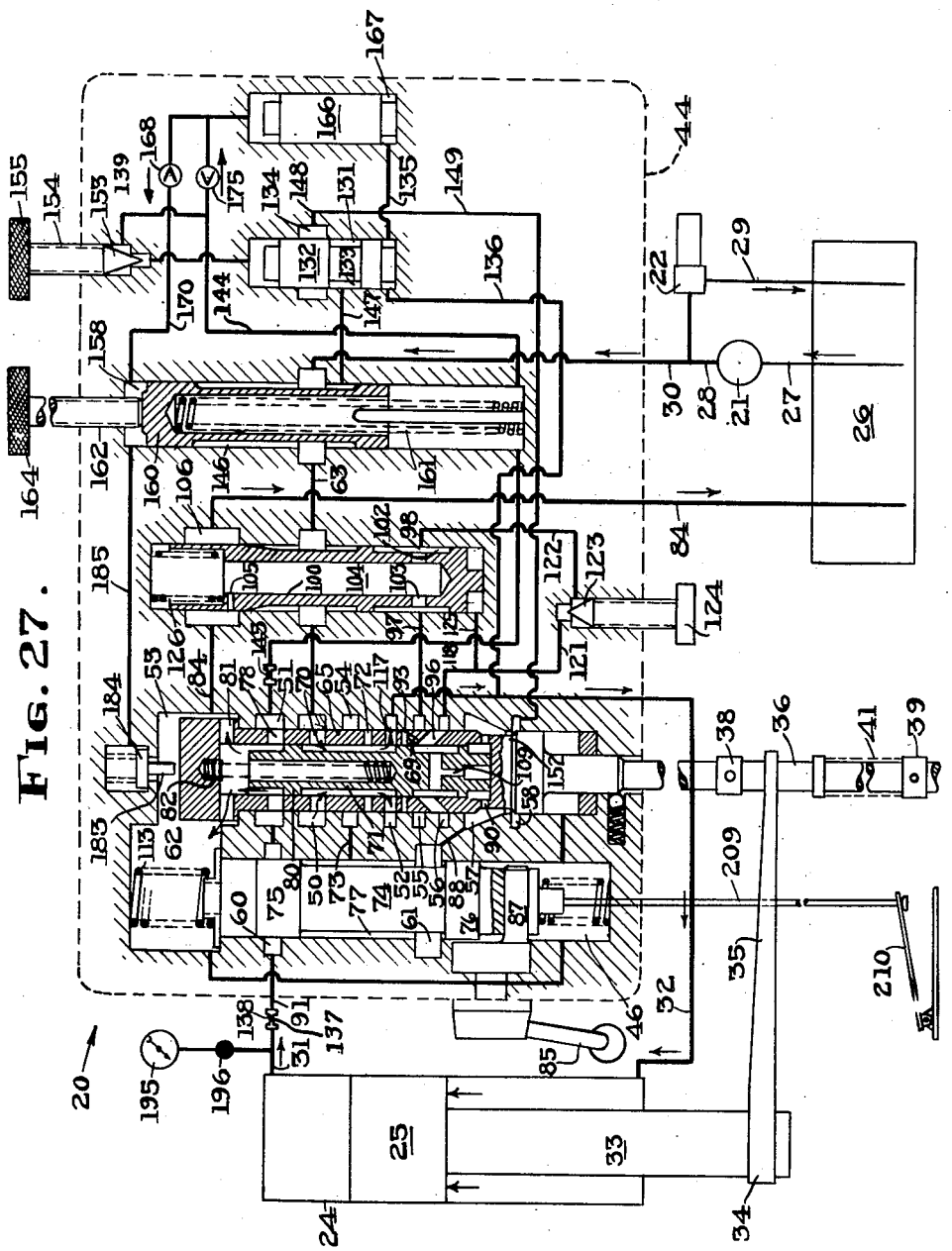

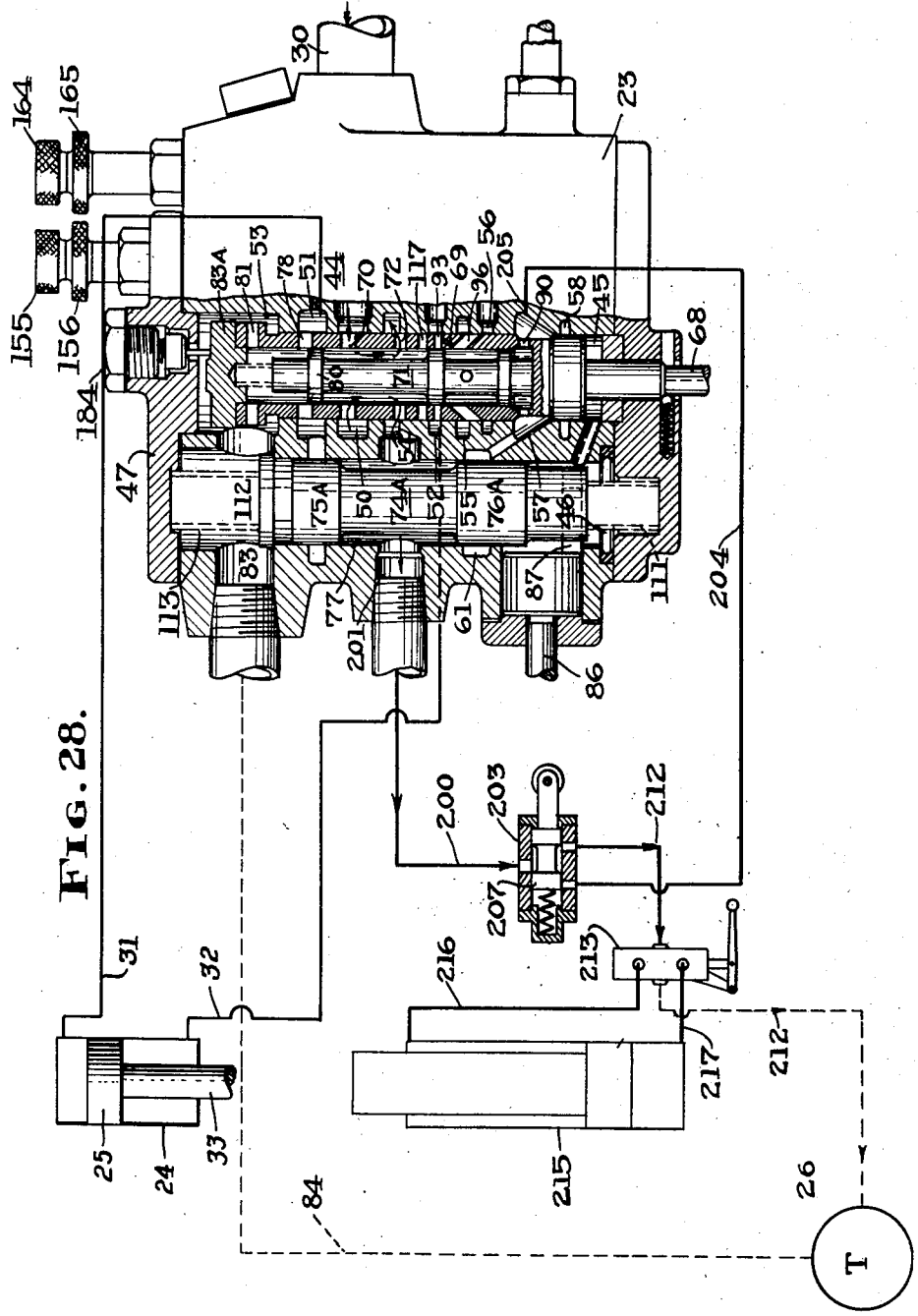

June 27, 1950  C. E. ADAMS  2,512,730
CONTROL VALVE MECHANISM FOR HYDRAULIC APPARATUS
Filed May 21, 1945  11 Sheets-Sheet 11

INVENTOR.
Cecil E. Adams
BY
Herschel C. Omohundro
ATTORNEY

Patented June 27, 1950

2,512,730

UNITED STATES PATENT OFFICE 2,512,730

CONTROL VALVE MECHANISM FOR HYDRAULIC APPARATUS

Cecil E. Adams, Columbus, Ohio, assignor to The Denison Engineering Company, Columbus, Ohio, a corporation of Ohio Application May 21, 1945, Serial No. 594,963

25 Claims. (Cl. 121—38)

This invention relates to the science of hydraulics. It is particularly directed to an improved hydraulic system and control mechanism incorporated therein for operating machine tools and parts thereof such, for example, as the ram of a hydraulic press.

An object of this invention is to provide a hydraulic system and control mechanism therein which will permit the operation of a machine tool or other movable element in a variety of ways. It is first desired to provide a control mechanism capable of causing a machine element to reciprocate. It is further desired to have the element perform either a single reciprocation or a plurality of successive reciprocations or cycles of operation. It is further desired to have a machine element execute a portion of a cycle of operation and exert a force on an object at the will of the operator. It is also desired to interrupt the cycle of operation of the element and have it return to a starting point instantly at the will of the operator.

In addition to the foregoing desires, it is an object to provide a control mechanism which will cause the element being governed to make one or more short, rapid reciprocations or vibrations in one or more cycles of operation of the element, whereby such element will impart a plurality of thrusts to an object at a preset force, the reciprocations or vibrations being performed either during the automatically repeated cycles or a single cycle of operation of the element.

A further object of the invention is to provide the control mechanism with a means for predetermining the length of the short reciprocations or strokes of the element.

Another object of the invention is to provide the control means with an adjustment whereby the number of short reciprocations or strokes may be varied.

It is a further object of the invention to provide the control mechanism with means operative when the machine element has reached a predetermined point in its cycle of operation to reset the mechanism employed to determine the number of short strokes for another cycle of operation.

Another object is to provide the control mechanism with pressure responsive means for changing the rate of travel of the machine element at a desired point in the cycle of movement thereof, the element thus being operated, if desired, at a rapid rate during the first portion of the cycle and at a slower rate during another portion of such cycle.

It is an object of the invention to provide all the means mentioned in the foregoing paragraphs in a single housing or body whereby the fabrication thereof will be facilitated through a reduction of the number of parts and the time consumed in machining and assembling all the elements.

In the drawings:

Fig. 3 is a vertical longitudinal sectional view taken through the control mechanism on the plane indicated by the line III—III of Fig. 1;

Fig. 9 is a detail vertical sectional view taken on the plane indicated by the line IX—IX of Fig. 6;

Fig. 10 is a detailed vertical sectional view taken on the plane indicated by the line X—X of Fig. 9, this section extending the full height of the control mechanism even though only the lower portion thereof is shown in Fig. 9;

Fig. 10A is a detailed horizontal sectional view taken through the control mechanism on the plane indicated by the line XA—XA of Fig. 10;

Fig. 11 is a vertical transverse sectional view taken through the control mechanism on the plane indicated by the line XI—XI of Fig. 2;

Fig. 19 is a vertical longitudinal sectional view of the control mechanism showing the position of the parts therein during single cycle operation while the ram is moving downward at slow speed during the final stage of a power stroke;

Fig. 20 is a fragmentary vertical sectional view showing the parts of the control mechanism disposed to initiate a downward or power stroke and cause the automatic repetition of the cycle of operation of the ram;

Fig. 25 is a vertical sectional view taken through the control mechanism showing the parts therein disposed to cause the ram to exert a sustained downward force;

Fig. 26 is a detailed vertical sectional view taken through the manual spool on the plane indicated by the line XXVI—XXVI of Fig. 25, this figure showing in dotted lines the position of the operating element to locate the manual spool in the position shown in Fig. 25;

Fig. 27 is a diagrammatic view showing the piping arrangement of a hydraulic press provided with the control mechanism forming the subject matter of this invention; and Fig. 28 is a diagrammatic view of a system which may be connected with the control mechanism to make the operation thereof dependent upon that of an extraneous element.

Figure 1:
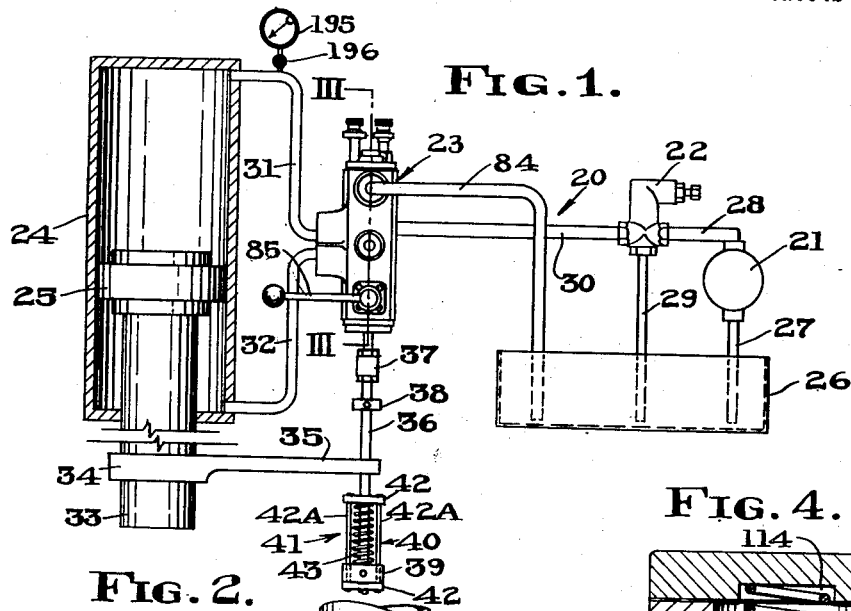
Fig. 1 is a diagrammatic view of a hydraulic circuit including a power unit and control mechanism therefor formed in accordance with the present invention.
Figure 2:
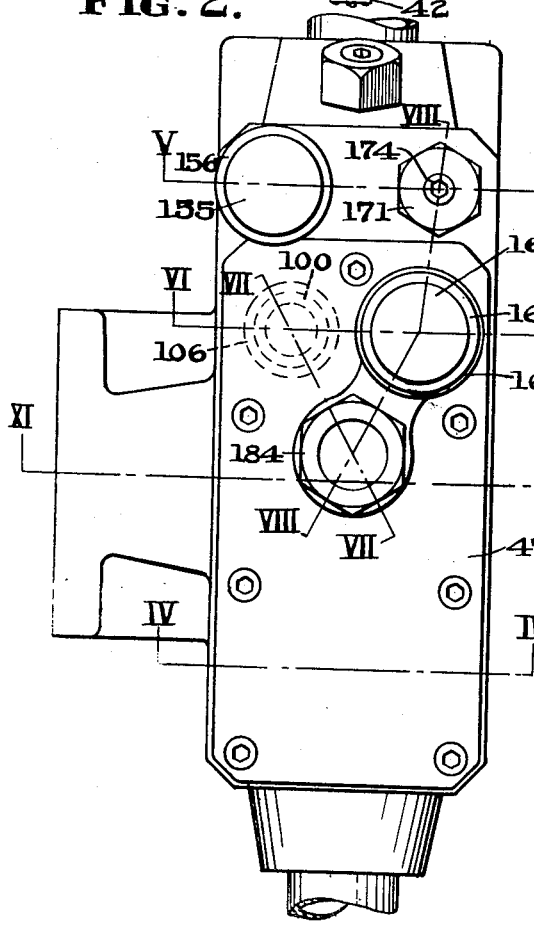
Fig. 2 is a plan view of the control mechanism shown in Figure 1.
Figure 4:
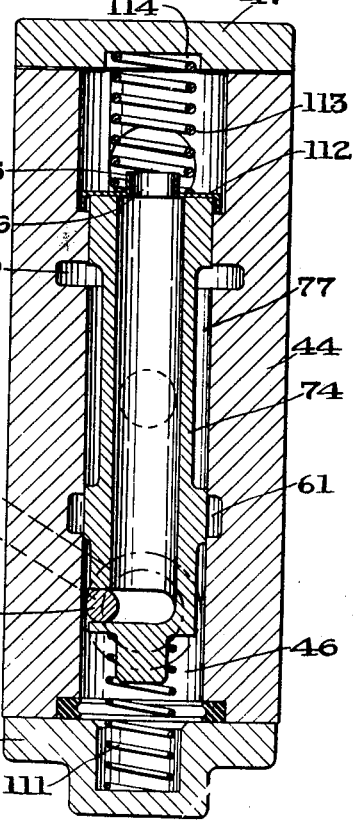
Fig. 4 is a vertical transverse sectional view taken through the control mechanism on the plane indicated by the line IV—IV of Fig. 2, certain parts at the rear of the plane of the section being indicated by broken lines.
Figure 5:
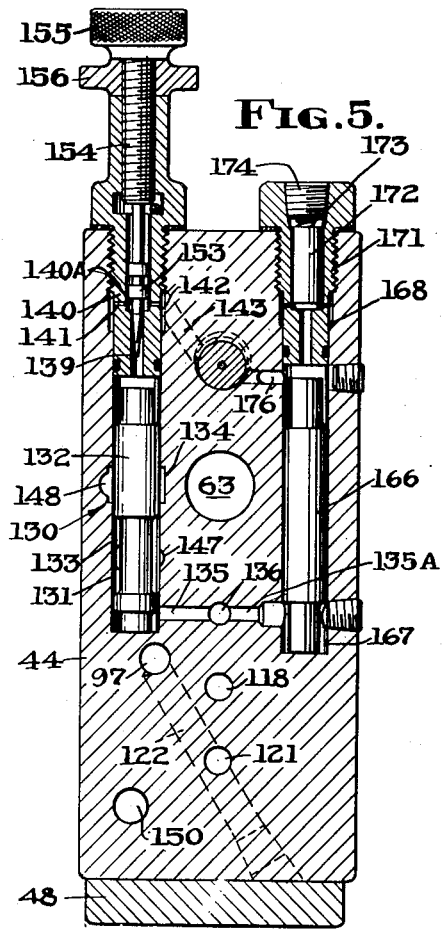
Fig. 5 is a similar view taken on the plane indicated by the line V—V of Fig. 2.
Figure 29:
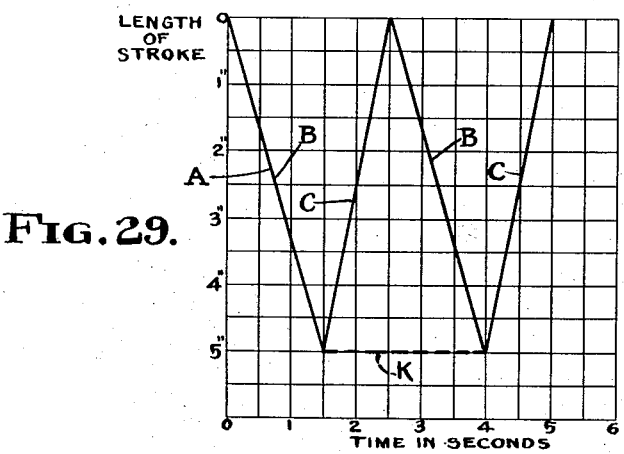
Figure 30:
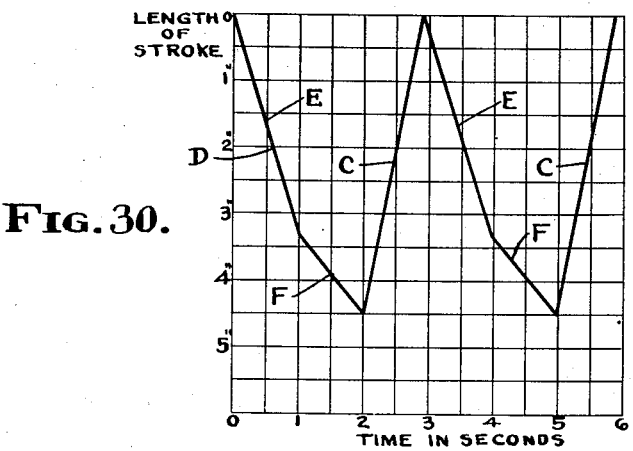
Figure 31:
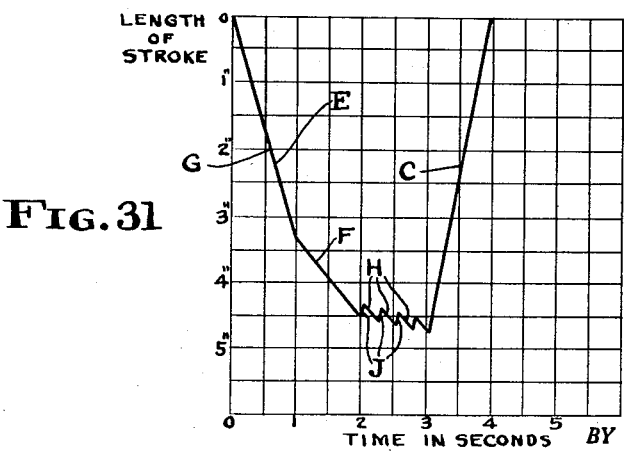

Figs. 29, 30, and 31 are graphic representations of movements of which an element, such as the ram shown in Fig. 1, is capable when governed by the control mechanism forming the subject matter of this invention.

Referring more particularly to the drawing, the numeral 20 designates generally a hydraulic circuit in which the control mechanism comprising the present invention has been incorporated. The circuit 20 includes a motor-driven pump 21, a relief valve 22, the control mechanism 23, and a fluid motor 24, the latter, in this instance, comprising a power cylinder having a reciprocating piston 25. The pump 21 draws fluid from a tank 26 through a pipe 27 and discharges this fluid through a pipe 28 to the relief valve 22. From this member the fluid normally flows through pipe 30 to the control mechanism 23 which is employed to alternately direct the fluid to the ends of the fluid motor 24 through lines 31 and 32. In case the fluid motor or the control mechanism does not use the full volume of the pump 21, the relief valve 22 will operate to return the excess fluid to tank 26 through line 29. It will be apparent that the lines 31 and 32 serve both as inlet and outlet lines, depending upon the direction of movement of the piston 25 in the cylinder 24.

As pointed out in the objects, a function of the control mechanism 23 is to so direct the fluid under pressure from the pump 21 to the power cylinder 24 that the piston 25 will be caused to operate in a plurality of different ways, the fundamental operation of the power cylinder being that in which the piston 25 moves back and forth throughout the full length of the cylinder 24. This motion of the piston imparts similar movement to the ram 33 which depends from the lower side of the piston 25 through the lower end of the power cylinder, in order to perform useful work. As shown in Fig. 1, the ram 33 has a collar 34 secured thereto which collar has a rearwardly projecting arm 35, the outer end of which surrounds a shipper rod 36 depending from the control mechanism 23. The shipper rod 36 is detachably connected as at 37, to the control mechanism 23, and is provided above and below the arm 35 with rigid collars 38 and 39. The latter collar forms a part of a spring assembly 40, surrounding the shipper rod below the arm 35. This spring assembly includes a frame 41 having upper and lower collars 42 connected by side rods 42A, and a spring 43. The spring surrounds the shipper rod above the collar 39 and one sliding collar 42 is disposed on the shipper rod above the spring while the other is disposed beneath the collar 39, the rods 42A connecting the upper and lower collars 42 extending through openings in the collar 39. When the spring assembly is fabricated, the spring 43 is initially compressed so that when the arm 35 first engages the upper collar 42 in its downward movement, similar motion will be transmitted directly to the shipper rod to move it and the parts of the control mechanism 23 connected therewith downward before the spring 43 is further compressed.

The function of the spring assembly and arm 35 will be apparent from the description which follows.

The details of construction of the control mechanism 23 are shown more particularly in Figs. 2 to 16 inclusive of the drawings. The control mechanism 23 comprises the body 44 which may be a metallic casting, a forging or other suitably formed body in which a plurality of suitably arranged bores are formed. As shown in Fig. 3 the body 44 has a pair of bores 45 and 46 extending vertically therein, the bore 45 being located adjacent the central portion of the body. Upper and lower caps 47 and 48 are secured to the upper and lower ends, respectively, of the body 44 to close the ends of the bores 45 and 46. The bore 45 intersects a plurality of chambers 50 to 58 inclusive while the bore 46 intersects chambers 60 and 61 and 62. The body 44 has also a horizontal bore 63 formed therein which communicates at its inner end with the chamber 50. The outer end of this bore is threaded, as at 64, to receive the similarly threaded end of the conduit 30 leading from the pump 21. By means of the pump 21 and conduit 30, fluid under pressure is supplied to the control mechanism, this fluid being admitted to the chamber 50.

To control the flow of fluid from the chamber 50 to the power cylinder 24, the bore 45 slidably receives a sleeve valve member 65 which is movable between raised and lowered positions. Normally, when the ram 33 is in an elevated position, the sleeve 65 will also be in a raised position due to the engagement of the arm 35 with the collar 38 on the shipper rod 36. The sleeve is yieldably held in its raised position by a spring pressed ball 66 which is disposed in a socket in the lower cap 48, the ball engaging a shoulder 67 formed on the reduced extension 68 of the sleeve valve 65. It will be noticed from Fig. 3 that when the sleeve is in a raised position, fluid under pressure may flow from the chamber 50 into the interior of the sleeve through ports 70. After reaching the interior of the sleeve, this fluid will be guided downwardly by a shuttle member 71 disposed for sliding movement in the sleeve to ports 72 which, when the sleeve is in the elevated position, establishes communication between the interior of the sleeve and chamber 54. This chamber is connected by the inner end portion of a bored hole 73 with the bore 46 whereby the fluid flowing into the chamber 54 may find access to the interior of the bore 46 and the chamber 60. Fluid is prevented from reaching chamber 61, when the parts are located as shown in Fig. 3, by a spool 74 disposed for sliding movement in the bore 46. The spool 74 has upper and lower lands 75 and 76 which are spaced to provide an elongated groove 77 which forms a channel for fluid to flow between the hole 73 and the chambers 60 and 61 depending upon the position of the spool 74. Under normal conditions the spool 74 will be in the position shown in Fig. 3 in which position the land 76 blocks the chamber 61 so that fluid flowing through hole 73 will be directed into the chamber 60. As disclosed in Fig. 3, this chamber intersects chamber 51 and fluid admitted to the former may flow without opposition into the latter. With the shuttle in the position shown in Fig. 3, this fluid will then flow through ports 78 formed in sleeve 65 to the interior thereof above a land 80 formed on the shuttle 71. This fluid will then flow from the interior of the sleeve through ports 81 provided adjacent the upper end of the sleeve into chamber 53, through port 82A to chamber 62 at the upper end of the bore 46. Fluid flows from the chamber 62 through a bored hole 83 to a pipe 84 which leads from the control mechanism 23 to the tank 26. It will thus be apparent that when the ram is at rest, the fluid delivered by the pump 21 will be returned to the tank 26 without appreciable pressure being generated thereon and the pump will operate without any load. When the parts of the control mechanism are disposed as shown in Fig. 3, the shuttle 71 will be held in a lowered position against the bottom wall 81 at the lower end of the spool 65 by a coil spring 82 disposed between a cap 83A, closing the open upper end of the spool, and the inner end wall of a socket formed in the shuttle. The spring 82 yieldably resists upward movement of the shuttle, thus maintaining the same in its lowered position until sufficient fluid pressure is built up in the lower end of the sleeve below the shuttle at which time the latter will be elevated to the position shown in Fig. 15.

This figure also shows the manual spool 74 and the sleeve 65 in the positions they will occupy to initiate the operation of the ram 33. It will be noted from Fig. 15 that the manual spool 74 has been lowered until the groove 77 communicates with the chamber 61. To effect this lowering of the spool 74, a manual control handle 85 is operated to rotate a shaft 86 connected therewith and an eccentric pin 87 from the positions shown in Fig. 4 to the positions shown in Fig. 16. When the spool 74 has been so lowered, hole 73 will be connected with chamber 61. Fluid may then flow from chamber 54 through hole 73 to chamber 61 from which it will flow through hole 88 to chamber 57 adjacent the lower end of bore 45. The fluid thus admitted to chamber 57 will flow through ports 90 in the lower end of the spool to the interior of the spool below the shuttle 71. The force of this fluid under pressure will move the shuttle upwardly until the land 80 thereon is positioned above the ports 78 in the spool. Fluid may then flow from the chamber 50 to the interior of the spool through port 70 and upwardly to the port 78 through which it will flow to the chamber 51. As shown in Fig. 11, this chamber communicates with the passage 91 the outer end of which is connected with line 31 leading to the upper end of cylinder 24. Fluid flowing along this path will cause the piston 25 and ram 33 to move downwardly in the cylinder 24 and fluid beneath the piston 25 will be discharged from the cylinder 24 through line 32 to the control mechanism.

Figure 6:
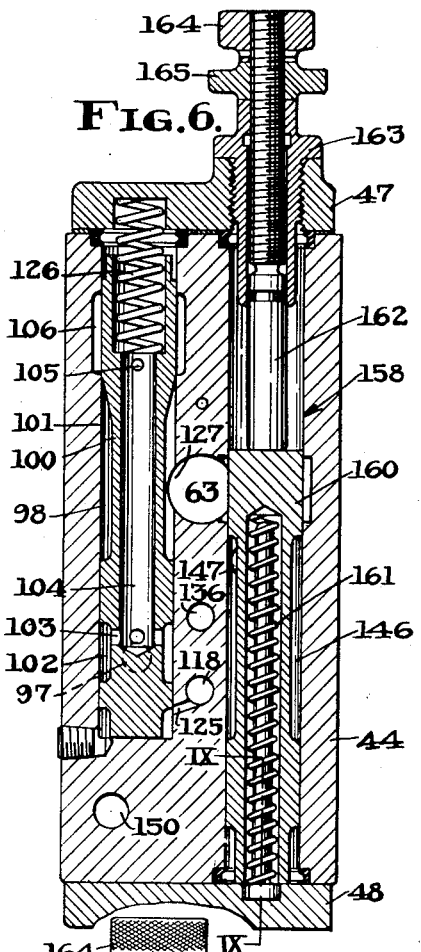
Fig. 6 is a vertical transverse sectional view taken on the plane indicated by the line VI—VI of Fig. 2.
Figure 7:
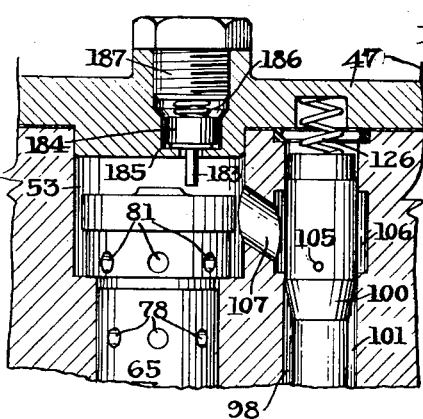
Fig. 7 is a fragmentary detailed sectional view taken on a vertical plane indicated by the line VII—VII of Fig. 2.

Line 32 is connected with a passage 92 (see Fig. 11) formed in the body 44 which passage in turn communicates with chamber 52. The fluid will then flow through ports 93 (see Fig. 15) to the interior of the sleeve 65 between lands 94 and 95 on the shuttle. Angular ports 96 in the sleeve 65 conduct this fluid to chamber 55 from which it will flow through passage 97 (see Fig. 13) to another vertical bore 98 formed in the body 44. As shown in Fig. 6 the bore 98 slidably receives a spool 100 which is formed with two annular grooves 101 and 102 which with the wall of the bore 98 form annular chambers. The passage 97 communicates with groove 102 and spool 100 is provided with lateral ports 103 to connect the groove 102 and consequently passage 97 with an axial passage 104 formed in the spool. This axial passage communicates by way of a reduced orifice 105 with an enlarged portion 106 of the bore 98, this enlarged portion forming a chamber around the upper portion of spool 100. As shown in Fig. 7, a short angular passage 107 formed in the body 44 connects the chamber 106 with the chamber 53 which is connected by port 82A, chamber 62, hole 83, and conduit 84 with the tank 26. It will thus be seen that when the control parts are positioned as in Fig. 15, fluid under pressure may flow to the upper end of the power cylinder while fluid is being discharged from the lower end thereof to the tank 26.

Figure 17:
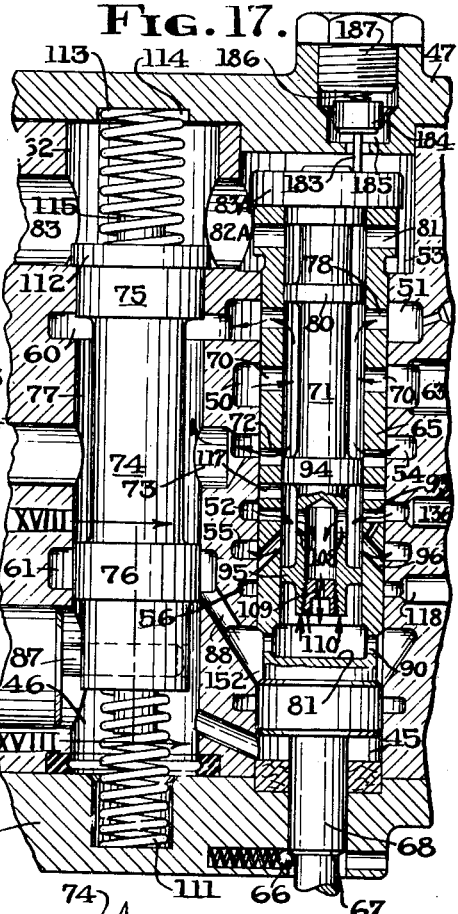
Fig. 17 is a view similar to Fig. 15 showing the parts of the control mechanism during a single cycle of operation, while the machine element is making the initial part of its power stroke at a rapid speed.

Due to the restriction to flow offered by the orifice 105, fluid in the system between this orifice and the lower end of the piston 25 will be under a back pressure which, among other places, will exist in the interior of the sleeve 65 between the lands 94 and 95 on the shuttle 71. This back pressure will be transmitted by ports 108 to the hollow lower end of the shuttle 71 and applied through a reduced orifice 109 formed in a plug 116 disposed in the lower end of the shuttle, to the fluid in the spool beneath the shuttle. The force of this back pressure will hold the shuttle in its elevated position even though the spool 74 returns to its normal position, as shown in Fig. 17, when the handle 85 is released. Spool 74 is returned to its normal position by coil spring 111 disposed between the lower end of the spool 74 and the bottom cap 48. This cap is recessed in registration with the bore 46 to receive and locate the lower end of the spring 111. The upper end of this spring is located against the spool 74 by a boss formed on the lower end of this spool. The tendency for the spring 111 to expand causes the spool 74 to move upwardly in the bore 46 until the upper end of the spool 74 engages a disc 112 located in the chamber 62. This disc is urged downwardly by a coil spring 113 disposed between the disc and the top cover 47. This cover is also provided with a recess 114 to receive and locate the upper end of the spring 113. The lower end of this spring is located by an upstanding cylindrical flange 115 surrounding an opening 116 in the center of the disc 112. Springs 111 and 113 tend to urge the spool 74 in opposite directions, but the force of the spring 113 is greater than that of the spring 111 so that when the spool 74 is moved upwardly by the spring 111, this movement will be terminated when the upper end of the spool engages the under side of disc 112. At this time spool 74 will be in the position shown in Figs. 4 and 17 wherein chamber 60 is open to the interior of the bore 46 and to chamber 54 through hole 73. Since chambers 51 and 54 both contain fluid at pump pressure and these chambers are connected by chamber 60 and bore 46, the location of spool 74 in this position will have no effect on the operation of the ram at this time. It will thus be seen that after the spool 74 has been moved downward through the manipulation of handle 85, this handle may be released to permit the spool 74 to return to a normal position as soon as the shuttle 71 has been raised and ram has started to move downwardly. Since these elements move substantially instantaneously, it is merely necessary for the operator to swing the handle 75 down to the position shown in Fig. 16 and immediately release the same to permit it to return to the normal position.

Figure 14:
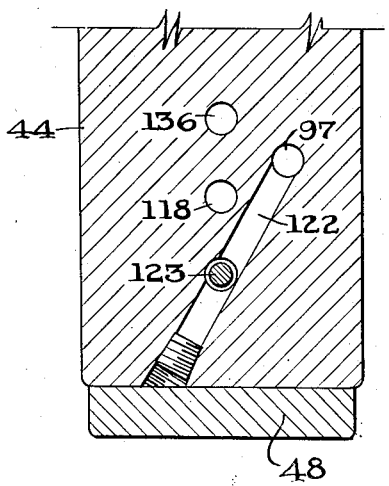
Fig. 14 is a detailed vertical sectional view taken on the plane indicated by the line XIV—XIV of Fig. 13.
Figure 15:
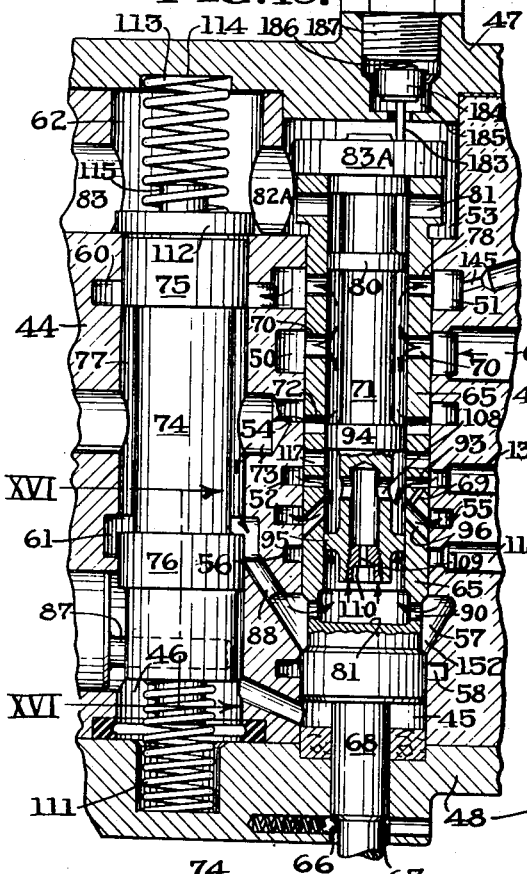
Fig. 15 is a fragmentary vertical sectional view taken through a portion of the control showing the parts in position to initiate operation of the machine element which, in the present illustration, is the press ram shown in Fig. 1.

After the cycle of operation of the ram has been initiated, this cycle will continue, the ram moving down at a relatively rapid rate during the initial movement until the arm 35 engages the upper collar 42 on the shipper rod and by this means moves the sleeve 65 down to its lower position, shown in Fig. 19. Continued downward movement of the ram will then cause the arm 35 to compress spring 43. When the sleeve is in its lowermost position, the angular ports 96 will connect the interior of the sleeve 65 with chamber 56 so that fluid flowing from the lower end of the power cylinder 24 to the chamber 52 will flow into the interior of the sleeve through ports 117, downwardly in the sleeve to the angular ports 96 and through these ports into the chamber 56. This chamber communicates with a horizontal duct 118 which is intersected intermediate its length by a vertical passage 120, see Fig. 3. The passage 120 in turn is intersected by a second horizontal passage 121 with which an angular passage 122, see Fig. 14, is connected. The upper end of this angular passage connects with passage 97, which, as previously described, connects with bore 98. After reaching the sleeve valve 65 the exhaust fluid from the power cylinder now flows through ports, 117, the interior of the sleeve, angular ports 96, chamber 56, ducts 118, 120, 121, 122, and passage 97 to bore 98 at groove 102. The fluid then flows through ports 103, the axial passage 104 of spool 100 and through the reduced orifice 105, thence to tank 26 the same as previously. As before, the restricted orifice 105 causes the back pressure which serves to retain the shuttle elevated during the downward operation or power stroke of the ram 33.

The passage 121 adjustably receives a needle valve 123 which is provided with an adjusting knob 124 at its outer end. Through the adjustment of the knob 124, the needle valve may be moved into and out of the bore 121 to vary the effective degree of communication between passage 121 and passage 122. By reducing the degree of communication between these passages a pressure drop is created whereby the pressure in the exhaust line between valve 123 and the lower end of the power cylinder is increased above that caused by the orifice 105. It will be noted from Fig. 6 that the passage 118 is connected by a reduced passage 125 with the lower end of bore 98. The fluid under back pressure will thus be introduced into the bore 98 below the spool 100 and will tend to move the spool 100 in an upward direction against the force of the spring 126. When the back pressure is sufficient to raise the spool 100 to a point where the groove 101 is connected with chamber 106, some of the fluid flowing into the control mechanism through passage 63 will be by-passed through bore 98 and chamber 106 directly to the tank since passage 63 connects with bore 98 as shown at 127. It is important to note at this point that the shuttle valve 69 and the spool 100 are both responsive to this back pressure and that the former must remain elevated to the upper position during the power stroke while the latter may move only slightly to by-pass the necessary amount of fluid to secure the desired ram speed. The shuttle valve must therefore respond more readily to the fluid pressure than the spool 100 otherwise the latter would permit full pump volume to be by-passed, shuttle valve would drop and the ram would reverse. The spool 100 is formed with a taper at the upper portion of groove 101 so that as it is moved upwardly, the volume of fluid permitted to flow into the chamber 106 will be progressively increased. When a portion of this pump pressure fluid is by-passed, the downward speed of the ram will be proportionately decreased, with the consequent result of decreasing the volume of fluid being exhausted from the lower end of the power cylinder. A sufficient downward speed of the ram will be maintained, however, to insure the predetermined pressure drop and consequently the position of the spool 100 necessary to secure the desired rate of movement of the ram. It will thus be seen that through the adjustment of the needle valve 123, the rate of movement of the ram 33 may be controlled. This control is effective, however, only after the arm 35 has engaged the collar 42 on the shipper rod and moved the shipper rod and sleeve 65 down in opposition to the resistance offered by the spring pressed ball 66. If it is desired to have the ram move at the same speed during the complete power stroke, the valve 123 may be adjusted to offer no resistance to fluid flow from line 121 to line 122. When this adjustment is made, the back pressure caused by the orifice 105 is applied equally to the upper and lower surfaces of the spool 100 and the spring may then hold the spool in its lowermost position, in which all the pump volume will flow to the power cylinder.

Figure 21:
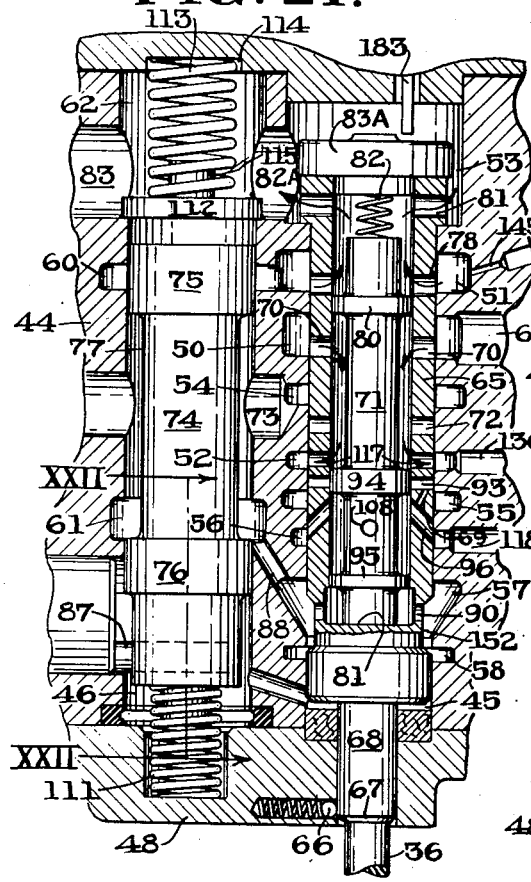
Fig. 21 is a similar view showing the parts of the control mechanism in position to effect upward or return movement of the ram during the automatic repetition of the cycle of operation of the ram.

When the downward movement of the piston and ram 33 is stopped, either through the engagement of the ram with an obstruction which positively prevents further movement or the engagement of the piston with the bottom of the cylinder 24, the flow of fluid from the lower end of the cylinder will be interrupted. When this interruption occurs, the back pressure will fall in the lower end of the cylinder 24, line 32, passage 92, chamber 52, sleeve 65, port 96, chamber 56, and passages 118, 120, 121, 122, and 98. The pressure beneath the spool 100 in the bore 98 will also fall, permitting the spring 126 to move this spool to a position where the by-passing of pump fluid will be discontinued. At this time full pump pressure will be applied to the piston 25 so that the ram will exert the maximum pressure, for which the relief valve 22 is set, on the work. When the back pressure in the lower end of the cylinder 24 and the line leading therefrom to the tank 26 falls, the pressure below the shuttle 71 will also fall due to the escape of fluid through the reduced bore 109 in the plug 110. At this time spring 82 will move the shuttle 71 downward until the lower end thereof engages the bottom wall 81 of the spool 65 as shown in Fig. 21, the sleeve being in a lowered position also. At this time fluid under pressure is directed from the pump 21 through lines 28 and 30, passages 63, chamber 50, ports 70, sleeve 65, ports 117, chamber 52, passage 92 and line 32 to the lower end of the power cylinder 24, to cause the piston 25 to move in an upward direction. As the piston approaches the upper end of its movement, the arm 35 will engage collar 38 and transmit movement to the shipper rod which will, in turn, cause the sleeve 65 to move to its upper position. At this time, the parts of the control mechanism will be disposed as shown in Fig. 3 in which position they cause the fluid supplied by the pump to be returned directly to the tank 26. The ram will then be at rest in its elevated position ready to execute another cycle of operation. The control 85 must then be swung downward to the position shown in Fig. 16, to repeat the cycle of operation just described.

Figure 23:
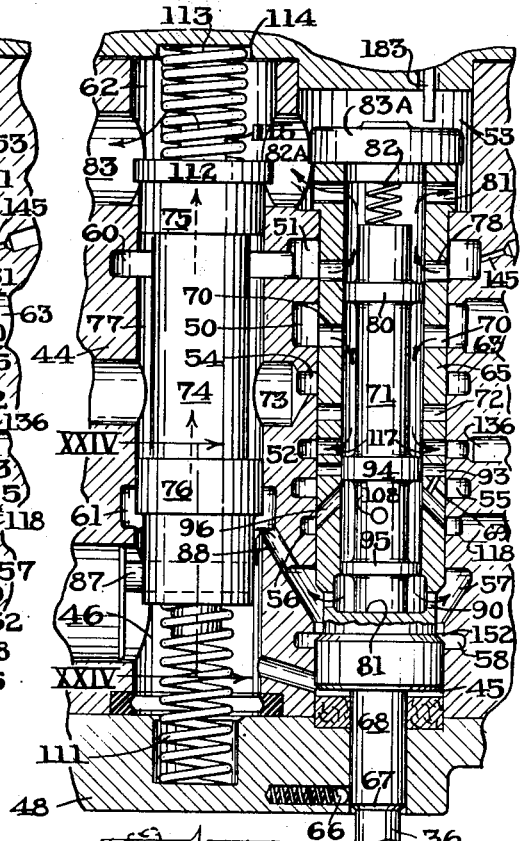
Fig. 23 is a view similar to Fig. 21 showing the parts of the control mechanism disposed to cause an emergency return of the ram to a raised, starting position.
Figures 22, 24:
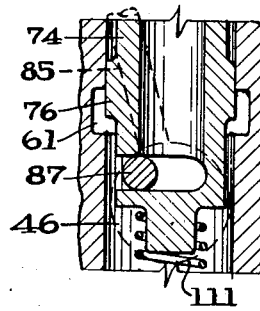
Fig. 22 is a fragmentary vertical sectional view taken through the manual control spool on the plane indicated by the line XXII—XXII of Fig. 21.
Fig. 24 is a detailed vertical sectional view taken on the plane indicated by the line XXIV—XXIV of Fig. 23.

If, in the operation of the ram, it is necessary to reverse the movement thereof during the power stroke, the control member 85 may be elevated or swung upwardly to the position shown in Fig. 24 in which position the spool 74 will be disposed as shown in Fig. 23. When the lever 85 is so operated, the spool will be moved upwardly against the action of the spring 113 and the chamber 61 will then be connected with the lower portion of the bore 46. This portion of the bore is connected through the hollow interior of the sleeve 74 with the chamber 62 at the upper end of the bore 46. Since the chamber 62 is connected directly with the tank 26, the chamber 57 surrounding the lower portion of the spool 65 will also be connected directly to the tank 26 through the passage 88 extending between chamber 61 and chamber 57. Fluid may then escape from the lower portion of the interior of the sleeve 65 below the shuttle 71 through ports 90 to the chamber 57 thence through passage 88, chamber 61, bore 46, the interior of spool 74 to chamber 62 and through line 84 to tank 26. By permitting the fluid to flow from the lower interior portion of spool 65 spring 82 will cause shuttle 71 to drop to its lowermost position in which fluid under pressure will be supplied to the lower end of the power cylinder 24 to cause the piston 25 to move upwardly and carry with it the ram 33. This emergency operation of the ram may be performed at any point in its power stroke, whether the ram is moving during the fast traverse portion of the stroke or the slower portion. After the control lever 85 has been moved to the emergency reverse position and the ram reaches its normal elevated position, the lever may be released and permitted to return to its normal position, under the influence of spring 113. In the operation of a press, it is sometimes desired to have the ram exert continuous downward force. This result is secured by moving the manual lever 85 to initiate the operation of the ram as previously described and then partially returning the lever toward its normal position to place the spool 74 in the position shown in Fig. 25. The chamber 60 and 61 will be in communication through the groove 77 so that the same fluid pressure in the upper end of the power cylinder and the line leading from the pump 21 thereto will be transmitted to the lower end of the shuttle 71 by way of passage 88, chamber 57 and ports 90. This fluid pressure will hold the shuttle in its upper position to direct fluid toward the upper end of the power cylinder and consequently the ram will be held down until the manual spool 74 is moved to a position in which the fluid pressure will no longer be directed to the lower end of the shuttle and the spring will cause its return to the lower position, as previously described, to effect the elevation of the ram.

In some instances, it may be found desirable to have the ram 33 move downward into engagement with an article of work and then perform one or more short, rapid reciprocations whereby repeated thrusts may be transmitted to the work, these thrusts being delivered with the full force of the ram, determined by the relief valve 22. To secure this modified form of operation, the mechanism, indicated generally by the numeral 130 in Fig. 5, has been provided. This mechanism includes a vertical bore 131 formed in the body 44 for the reception of a spool member 132. The spool 132 has a groove 133 formed in the sidewall thereof and the bore 131 also has a groove or enlarged portion 134 which is normally prevented from communicating with the groove 133 by the upper unreduced portion of the spool 132. Communication between the grooves 133 and 134 can only be established by moving the spool 132 upwardly until the shoulder at the upper end of groove 133 passes the lower shoulder of groove 134. This operation is performed by fluid pressure introduced to the lower end of the bore 131 through a passage 135 extending transversely of the body 44. This passage 135 intersects a passage 136 extending horizontally into the body 44 and connecting at its inner end, see Fig. 3, with the chamber 52 which chamber is connected by passage 92, see Fig. 11, with the line 32 extending to the lower end of the cylinder 24.

It will be seen that after the ram 33 has moved downwardly in a normal cycle of operation to its lowermost position, limited either by the engagement of piston 25 with the bottom wall of the cylinder 24 or the engagement of the ram with an obstruction offering sufficient resisting force to prevent further downward movement of the ram, fluid from the pump will be directed into the lower end of the cylinder 24, as previously described, to cause the piston to move upwardly. A portion of this fluid will flow into the passage 136 and from this passage through passage 135 to the lower end of bore 131. To create the pressure necessary to effect the operation of the short stroke creating mechanism 130 it is necessary to restrict the exhaust flow of fluid from the upper end of the power cylinder. This restriction is secured in the present instance, by placing a plug 137 having a reduced opening 138 in the passage 91. The opening 138 is of such size that it will restrict flow when a large volume is being exhausted from the upper end of the power cylinder due to the full pump output being delivered to the rod side of the piston but will not interfere with the flow of fluid to the power cylinder on the power stroke of the ram. Because of the resistance offered by the plug 137, the fluid supplied to the lower end of the power cylinder will be under pressure which will be transmitted to the bore 131 through passages 136 and 135. This fluid pressure will exert a force on the spool 132 and tend to move the same upwardly. In moving in this direction, spool 132 will expel fluid from the upper end of bore 131 through a passage 139 formed in a control body insert 140 which is threaded into the bore 131 at its upper end. The passage 139 connects with a cavity 140A formed in the insert 140, this cavity being connected by reduced lateral passages 141 with an annular chamber 142 surrounding the lower portion of the insert 140. This annular chamber is connected by an angularly extending passage 143 which communicates with another passage 144 leading, as shown in Fig. 3, to chamber 51. Fluid flow between passage 144 and chamber 51 is limited by a restriction 145 formed in the passage 144. The purpose of this restriction will be hereinafter set forth.

It will be apparent from the foregoing that when fluid under pressure is supplied to the lower end of bore 131, spool 132 will be elevated and will force fluid from the upper end of the bore 131 through passage 139, chamber 140A, passages 141, chamber 142, passages 143 and 144, into chamber 51 from which this fluid will flow to tank 26. Since chamber 51 is connected with the upper end of the power cylinder 24, fluid under pressure will be supplied through the series of passages and chambers 144, 143, 142, 141, 140A and 139 just mentioned, to the upper end of bore 131 when fluid is supplied to the upper end of cylinder 24 to move piston 25 downwardly, thus the spool 132 will be moved downwardly sufficiently to permit the shoulder at the upper end of groove 133 to interrupt communication between this groove and groove 134. It will thus be seen that the spool 132 moves upwardly to establish communication between lines 147 and 143 each time piston 25 moves upwardly and downwardly to interrupt such communication each time the piston 25 moves downwardly. When, during the upward movement of the spool 132, the groove 133 communicates with groove 134, fluid under pump pressure will be admitted to chamber 58 from which it will flow into chamber 57 and through ports 90 to the interior of the sleeve 65 below shuttle 71. The path of this fluid is as follows: from passage 63, fluid flows into a vertical bore 146, see Fig. 6, formed in the body 44 at one side of the bore 98, downwardly in bore 146 and outwardly therefrom through a passage 147, see Fig. 12, to the bore 131. The passage 147 extends diagonally from the bore 146 to the bore 131 at the groove 133. When grooves 133 and 134 are in communication, fluid thus admitted to groove 133 will flow into groove 134 and from this groove through a horizontal passage 148, a vertical passage 149, and a horizontal passage 150, see Figs. 5, 10, and 10A, to annular groove 58 surrounding the lower end of the sleeve 65. When the sleeve 65 is in a lowered position, an external groove 152 formed in the lower portion thereof establishes communication between the chamber 58 and the chamber 57 whereby this fluid may flow to and through ports 90 to the interior of the lower portion of the sleeve 65 below the shuttle 71. This operation takes place when the ram is moving in an upward direction and the shuttle is in its lowered position.

The admission of fluid under pressure in this manner will force the shuttle 71 to move upwardly whereby fluid under pump pressure will be directed to the upper end of the power cylinder 24 and cause the ram again to move in a downward direction. The length of time required for the spool 132 to move sufficiently to establish communication between grooves 133 and 134 will determine the distance traversed by the ram on its short stroke. If only a short time is required, the distance moved by the ram will be relatively short, whereas if a longer time is required, the ram will move a greater distance. To control the length of time required by the spool 132, the insert 140 is provided with an adjustable needle valve 153 which controls the communication between the passage 139 and the cavity 140A. This needle valve is provided with a threaded stem 154 having an adjusting knob 155 at the upper end thereof.

The threaded stem is also provided with a knurled lock nut 156 which is employed to maintain the adjustment of the valve 153. It will be seen that each time the ram starts an upward movement or stroke when the mechanism 130 is in operating condition, fluid under pressure will be supplied to the lower end of spool 132. When this fluid has moved the spool to its upper position wherein communication is established between grooves 133 and 134 the shuttle will be elevated to cause the ram to reverse and move downwardly. These short strokes will be continued indefinitely unless interrupted by some suitable means.

One such means has been illustrated in Fig. 6 and is designated generally by the numeral 158. This mechanism regulates the number of times the short stroke is repeated; it is hereafter designated as the stroke counting mechanism. This mechanism is shown in an inoperative condition in Fig. 6 and in an operative condition in Fig. 27; it comprises a spool 160 which is slidably positioned in the bore 146 and is formed hollow for the reception of a coil spring 161 which engages the closed inner end of the spool and the bottom cover 48. The spring tends to force the spool 160 upwardly in the bore 146, normally holding the spool against the lower end of a stop screw 162 which is threadedly received in an insert 163 threaded into the cap 47 over the bore 146. The adjustable stop screw 162 is also provided with a knob 164 to effect its operation and a knurled lock nut 165 for maintaining the positions of adjustment. Through the operation of the screw 162, the number of times the ram repeats the short stroke will be varied. While the mechanism 158 has been designated as a counting mechanism, it depends upon the displacement of fluid for its operation.

The stroke counting mechanism also includes a second spool or piston 166 which is disposed for movement in a bore 167 arranged parallel to the bore 131 in the body 44. The piston 166 is responsive to fluid pressure to force fluid from the upper end of the bore 167 into the upper end of bore 146. This fluid is forced through a check valve mechanism 168 to a passage 170 (Fig. 8) and thence to the upper end of bore 146. The check valve mechanism 168 includes a body 171 which is threaded into the upper end of bore 167. This body has access for the slidable reception of the check valve itself, this check valve being designated by numeral 172. A coil spring 173 disposed between the check valve 172 and a plug 174 serves to urge the check valve toward a seated position. After being elevated, piston 166 is returned to its lowered position when fluid under pressure is supplied to the power cylinder to move the ram in a downward direction. The fluid for returning piston 166 is supplied thereto through restriction 145, see Fig. 3, passage 144, a check valve mechanism 175 disposed in the outer end of the passage 174, and a short lateral passage 176 leading from the outlet of the check valve to the upper end of bore 167 just below check valve mechanism 168. Check valve mechanism 175 is similar to check valve 168 and includes a body 177 having a chamber for the reception of a valve 178. A coil spring 179 tends to urge the valve 178 toward the closed position to restrict fluid flow to one direction only, the valve 178 permitting fluid flow toward bore 167 while valve 168 permits fluid flow away from the bore 167.

From the foregoing it will be seen that each time the piston 25 in the power cylinder 24 moves upwardly or downwardly, the piston 166 in bore 167 will move in the same direction. On each upward stroke, this piston will displace a definite amount of fluid which will pass through the check valve 168 and passage 170 into the upper end of bore 146 above spool 160. The introduction of this fluid into the bore 146 on each upward stroke of the piston 166 will cause the spool 160 to be depressed in a step by step manner against the action of spring 161. To permit the downward movement of the spool 160, the fluid in the lower end of the bore 146 must be relieved. The path of this fluid is through an angular passage 180, shown in Fig. 9, to a vertical passage 181 which connects at its upper end with a transverse passage 182 leading to the passage 144. Since fluid is being supplied to the lower end of the power cylinder when the spool 160 is moved downwardly, the upper end of the power cylinder and the chamber 51 with which passage 144 is connected will be in communication with tank 26. The fluid may therefore be discharged from the lower end of bore 146 without appreciable resistance. When the unreduced portion at the upper end of the spool 160 passes the point in the bore 146 at which communication between the passage 63 and bore 146 takes place, fluid flow under pressure into the bore 146 will be discontinued and fluid under pressure can no longer be supplied to the under side of the shuttle through bore 146, passage 147, bore 131, grooves 133 and 134, passage 148, 149 and 150, chamber 58, groove 152, chamber 57 and ports 90. The piston 25 will therefore execute a complete return stroke without interruption. As previously set forth, the arm 35 will engage the collar 38, near the end of the return stroke of the ram, and push the sleeve 65 to its upper position wherein the groove 152 will no longer connect chambers 57 and 58. The flow of fluid under pressure to the under side of the shuttle before the counting mechanism 158 can be completely reset, in a manner to be presently described, is thereby precluded. If the manual spool 74 is set for a single cycle of operation, the ram will come to rest when the arm 35 engages the collar 38 and moves sleeve 65 to its upper position. At this time the parts will be in the position shown in Fig. 3 wherein the flow from the pump will be by-passed directly to tank 26.

Figure 8:
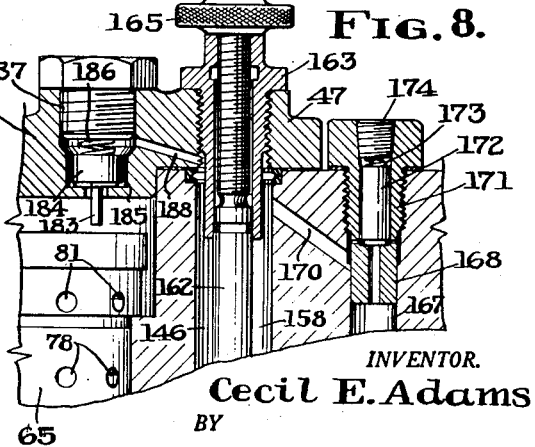
Fig. 8 is a similar view taken on the plane indicated by the line VIII—VIII of Fig. 2.
Figure 12:
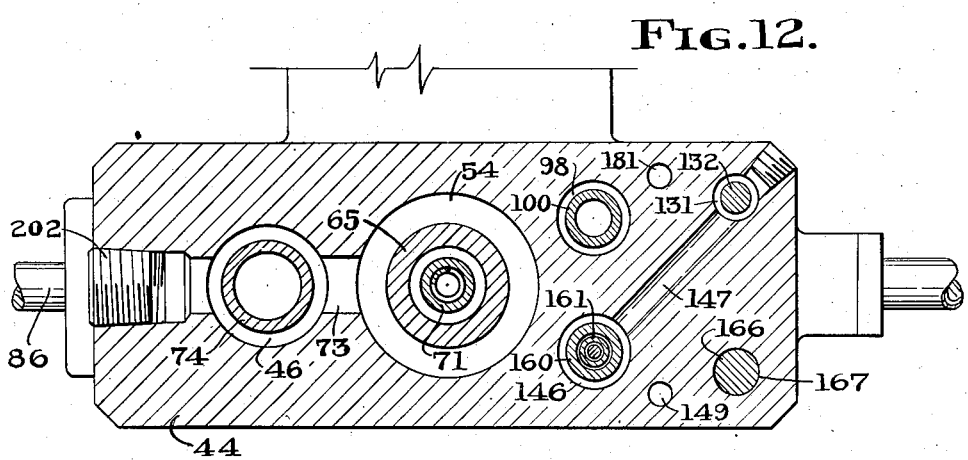
Fig. 12 is a horizontal sectional view taken through the control mechanism on the plane indicated by the line XII—XII of Fig. 3.
Figure 13:
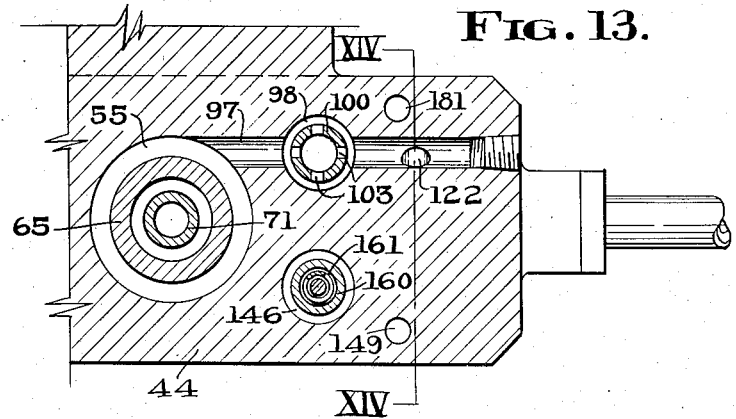
Fig. 13 is a similar view taken on the plane indicated by the line XIII—XIII of Fig. 3.

During the final stage of upward movement, after communication between grooves 58 and 57 has been interrupted but before communication is reestablished between the interior of the sleeve 65 and groove 54, the cap at the upper end of the sleeve 65 will engage a depending stem 183 provided on a check valve 184. This valve is arranged in a recess 185 formed in the top cover 47; it is normally held in a closed position by spring 186 disposed between the valve 184 and a plug 187 threaded into the open upper end of the recess 185. As shown in Fig. 8, a passage 188 establishes communication between the recess 185 and the upper end of bore 146. When the valve 184 is unseated, the spring 161 will force the spool 160 upwardly to eject the fluid from the upper end of the bore 146. As the spool 160 moves upwardly, fluid will flow into the lower end of the bore 146 through passages 144, 182, 181, and 180 to relieve any suction. The upward movement of the spool 160 will be continued until the lower end of the stop screw 162 is engaged. In this manner, the spool 160 will be set for another operation. It should be obvious that by varying the vertical position of the stop screw 162, the volume of fluid required to move the spool 160 to the position to interrupt fluid flow between passages 63 and 147 will be changed. Consequently, the number of short strokes of the ram will be changed also.

In some instances it may be found desirable to have the cycle just described automatically repeated an indefinite number of times. To secure this automatic operation, the control lever 85 is manipulated to move the manual spool 74 into the position shown in Figs. 20 and 21. This position of the control handle is indicated by dotted lines in Fig. 22. At this time the unreduced portion 75 of the manual spool 74 will block off the chamber 60 from passage 73 while the portion 76 of this spool will permit unrestricted communication between this passage, chamber 61 and the angular passage 88. When the spool 74 is in this position and the sleeve 65 is moved upwardly through the engagement of the arm 35 with the collar 38 fluid under pressure from the pump will flow from chamber 50 through port 70 to the interior of the sleeve and through port 72 to chamber 54 from which it will flow through opening 73, bore 46, chamber 61 and angular passage 88 to chamber 57. It will then flow through ports 90 to the lower end of the spool beneath the shuttle 71. The force of this fluid will move the shuttle to an elevated position causing fluid under pump pressure to be directed to the upper end of the power cylinder 24. Another cycle of operation will then be initiated. These cycles, in which the ram moves downwardly, then delivers a series of sharp impulses at the lower end of its stroke and returns to its upper position, will be repeated as long as the manual spool 74 is held in the position shown in Figs. 21 and 22. When it is desired to terminate this operation, the control member 85 is flipped upwardly to the position shown in Figs. 4 and 18, at which time the manual spool 74 will block the chamber 61 from passage 73. When this spool is in this position and the ram approaches the upper end of its stroke, the fluid supplied to the control mechanism by the pump will be bypassed around the power cylinder 24 to the reservoir 26.

When it is desired to have the ram execute a cycle of operation without the short rapid impulses or reciprocations, the knob 164 of the counting mechanism is adjusted to position the stop screw 162 in its lowermost position, as shown in Fig. 6, wherein the spool 160 will prevent communication between the passage 63 and the interior of the bore 146. When this communication is interrupted, fluid cannot flow from the chamber 58 and the pump pressure line and the upward movement of the ram will not be interrupted until the return stroke is completed.

As illustrated in Figs. 3, 15, 17, 20, 21, and 23, the valve 184 is held in an open position by sleeve 65 when it is in an upper position and the ram is moving downwardly during the fast traverse portion of the power stroke. During this time fluid under pump pressure is being supplied to the chamber 51 which is connected with the upper end of the power cylinder. The constriction 145 is provided between chamber 51 and passage 144 to prevent the loss of fluid pressure from chamber 51 through line 144, check valve 175, passage 176, check valve 168, passage 170, bore 146, passage 188, and chamber 185 to chamber 53 and tank 26. Since both ends of the bore 146 are connected by passages, the fluid pressure on the ends of the spool will be balanced and there will be no tendency for the same to move when fluid is supplied to bore 167 on the power stroke of the ram.

To determine the pressure being developed in the system, gauge 195 is connected with the line 31 leading to the upper end of the power cylinder. A valve 196 is positioned between this gauge and the line 31 to prevent injury to the gauge during the rapid changes of pressure in the operation of the ram. When it is desired to determine the force being exercised by the ram, the manual control 85 is manipulated, first, to move the manual spool 74 to the position shown in Fig. 15 whereby the operation of the ram will be initiated. After the ram begins to move downward, the control is moved back a slight distance to position the same, as indicated by dotted lines in Fig. 26, to cause the same to perform the hold down operation previously described. The manual spool will then be in the position shown in Fig. 25. When in this position the spool 74 serves to connect the chambers 60 and 61 and thus permits a portion of the fluid flowing to the upper end of the power cylinder 24 to be directed to the chamber 61 and from this chamber through passage 88 to chamber 57. This fluid pressure flows through ports 90 in spool 65 and is applied to the lower end of the shuttle 71. As previously mentioned, the downward movement of the piston 25 in the power cylinder 24 expels fluid from the lower end of this power cylinder which fluid is returned to the tank 26. The restriction 105 in spool 100 causes a back pressure on the fluid thus being expelled which back pressure is directed by passages mentioned previously to the interior of the spool beneath the shuttle. This back pressure serves normally to maintain the shuttle in an elevated position so that fluid being supplied to the mechanism will be directed to the upper end of the power cylinder. In the normal operation of the device, the spring 82 returns the shuttle to a lowered position when the piston 25 stops in its downward movement from any cause whatever. When the manual spool 74 is in the position shown in Fig. 25, however, fluid under pump pressure is constantly applied to the lower end of the shuttle to hold it in an elevated position and direct fluid under pump pressure to the upper end of the power cylinder whereby the ram will be held in its lowered position. During this time the maximum capacity of the press, that is, the capacity for which relief valve 22 has previously been set, will be exerted upon the work disposed beneath the ram. At this time, also, valve 196 may be opened to admit fluid under the pressure existing in the system to be applied to the pressure indicator 195. After the reading has been taken from the gauge 195, the valve 196 should be closed to prevent injury to the pressure indicator as previously mentioned.

During the foregoing, the operation of each part has been given as its description has proceeded. A summary of the operation of the device as a unit will now be given. This operation can best be understood by a reference to the flow diagram shown in Fig. 27.

*Single cycle plain reciprocation.*—Fluid from reservoir 26 is forced by pump 21 through line 30 to chamber 50 in the body 44. When the sleeve 65 is in an elevated position and shuttle 51 is in its lowered position, this fluid will flow from chamber 50 into the interior of sleeve 65, downwardly therein and outwardly through ports 72 to chamber 54 from which it will flow through opening 73 into bore 46 whence it will flow upwardly to chamber 60 from which it will flow to chamber 51 and thence through port 78 to the interior of the sleeve 65 and upwardly to the ports 81. This fluid will flow through these ports to chamber 53 and thence to the reservoir 26 through port 82A, chamber 62, port 83 and line 84. This bypassing of fluid is indicated by arrows in Fig. 3. To initiate the operation of the ram 33, spool 74 is lowered sufficiently to permit groove 77 therein to establish a flow between chamber 50 and groove 57 in the body 44 by way of port 70 in the sleeve 65, the interior of the sleeve between lands 80 and 94 on the shuttle, port 72 in sleeve 65, chamber 54, passage 73, bore 46, and passage 88. This flow will cause a fluid pressure in chamber 57 which will be transmitted through ports 90 to the interior of the lower end of the sleeve. This avenue of pressure applies a force to the under side of shuttle 71 and causes the same to be moved to an elevated position against the resistance offered by spring 82. When in a raised position, the shuttle then connects chambers 50 and 51 through ports 70 and 78 in the sleeve 65. Fluid under pressure may then flow to the upper end of the power cylinder 24 through passage 91 and line 31 and will tend to urge the piston 25 therein downwardly. This motion forces fluid out of the lower end of the cylinder through line 32 to chamber 52 in body 44. As this chamber 52 at this time is connected by port 93, the interior of the sleeve and ports 96 with the chamber 55 which is in turn connected by line 97 with bore 98, the fluid flowing from the power cylinder 24 will pass to the bore 98 at the grooved portion 102 of spool 100. This fluid will flow through ports 103 to the center bore 104 of the spool and upwardly to restricted port 105 through which the fluid will flow to chamber 106. From this chamber the fluid will flow through passage 84 to tank 26.

The back pressure on the fluid flowing from the cylinder caused by the restricted port 105 is applied to the lower end of the shuttle through ports 108 and a bore 109 formed therein to hold the shuttle in its elevated position. As soon as the downward motion of the ram is initiated, the control 85 may be released to permit the spool 74 to return to its normal position shown in Fig. 3. The back pressure on the under side of the shuttle will retain this member elevated until the exhaust flow of fluid from the lower end of the power cylinder is discontinued, either through the engagement of the piston 25 with the lower end of the cylinder or the engagement of the ram 33 with an obstruction which offers sufficient resistance to prevent movement thereof. In either event, the fluid pressure in the system between pump 21 and piston 25 in the power cylinder will be elevated to the maximum for which relief valve 22 has been previously set. At this time the ram 33 will be exerting the maximum force or tonnage for the particular setting of the relief valve. When the exhaust fluid ceases to flow from the power cylinder, the back pressure will fall in the system between restriction 105 and piston 25 and fluid will be forced from the sleeve 65 beneath the shuttle through the restricted port 109 in plug 110 permitting the shuttle to move to its lower position. At this time chamber 50 will be connected with the chamber 52 and fluid under pump pressure will be supplied to the lower end of the power cylinder through line 32 to effect the elevation of the piston 25. Before reaching the lower end of its travel, the ram 33 will transmit movement through arm 35 to the shipper rod 36 which will in turn transmit the downward movement to the sleeve 65. This downward movement is limited through the engagement of a shoulder at the upper end of the sleeve with a complemental shoulder formed in the body 44. At this time, the angular ports 96 will connect the interior of the sleeve with chamber 56. The exhaust flow of fluid will then be directed through passages 118, 121, and 122 to the bore 98. This rerouting of the fluid will have no effect upon the operation of the device as long as needle valve 123 is in a fully open position. If it is desired to have the ram 33 move at a reduced rate of speed during the final movement thereof in a downward direction, the needle valve 123 may be adjusted to restrict fluid flow between passages 121 and 122. This restriction will cause a pressure differential between passages 121 and 122, the higher pressure of which will be transmitted through passage 125 to the lower end of bore 98 where it will be applied to the lower end of the spool 100. This application of fluid pressure to the spool moves the same upwardly in opposition to the spring 126 until the tapered portion at the upper end of groove 101 starts to enter chamber 106. When this movement takes place, some of the fluid under pump pressure will be by-passed directly to line 84 leading to reservoir 26. By adjusting the needle valve 123, the quantity of fluid by-passed may be varied; it will be seen, therefore, that changes in rate of travel of the ram may be secured through the adjustment of the needle valve 123. When two downward speeds are employed, that is, the rapid traverse during the first part of the downward movement and slower speed during the latter part thereof, the entire travel upward during the return of the ram, will be at a rapid rate. Near the termination of the upward movement of the ram 33, the arm 35 engages collar 38 on the shipper rod and shifts the sleeve 65 to its upper position. At this time, the parts therein will be in the position shown in Fig. 3 in which the fluid pressure from the pump will by-pass the power cylinder and be returned directly to the tank 26.

With the control mechanism shown herein, the operation of the ram may be modified in several ways. First, the ram may be operated to perform a hold down operation. This operation is secured by swinging the control handle 85 downward to the position indicated by dotted lines in Fig. 16. The manual control spool 74 will then be in the position shown in Fig. 15 to initiate the power stroke of the ram. After the ram starts its downward travel, the control 85 is moved backward or upward to the position indicated in Fig. 26 to place the spool 74 in the position shown in Fig. 25. In this position, this spool causes some of the fluid directed toward the upper end of the power cylinder to be diverted through the bore 46 and passage 88 to the under side of the shuttle. The force of this fluid will hold the shuttle up as long as the spool 74 is held in its position. When the handle 85 is released, the ram will return to its normal elevated position. Next, the plain reciprocating movement or cycle of the ram may be caused to automatically repeat an indefinite number of times. To secure this automatic repetition, the control 85 may be moved to the position shown by dotted lines in Fig. 22 in which position it will remain due to the fact that the eccentric pin 87 has been swung beyond the center line of the manual spool 74. The tendency for the spring 111 to expand serves to hold the eccentric pin 87 in the position on the opposite side of the center line of the spool 74 and thus prevents the spool from returning to its normal elevated position. With the manual spool held in its lowered position, the downward movement of the ram will be accomplished in the manner set forth above. The ram will also return toward its normal position in the same manner, but, when the arm 35 operates the shipper rod to shift the sleeve 65 to an elevated position, fluid under pump pressure will be directed into the bore 46 and downwardly therein to the chamber 61 from which it will flow through passage 88 to chamber 57 surrounding the lower end of the sleeve 65. The fluid under pump pressure will thus be applied through port 90 to the under side of the shuttle 71 causing the same to be elevated and direct fluid under pressure to the upper end of the power cylinder thus initiating another cycle of operation. As long as spool 74 is held in its lower position, the cycles of operation will be automatically repeated. As in the single cycle of operation, the flow control mechanism may be either utilized or not through the manipulation of the needle valve 123.

The operation of the ram may be further modified by having the ram perform a working stroke, impart a series of short sharp reciprocations adjacent the termination of the working stroke and then return to starting position. This modified operation is secured by adjusting the control knob 164 to permit spring 111 to move spool 160 to a position wherein passage 63 will be in communication with passage 147. When this communication is established, and shuttle 71 is moved to its lowered position at the termination of the downward movement of the ram 33, fluid under pump pressure will be supplied to the lower end of the power cylinder to effect elevation of the ram in the same manner as before; however, a portion of this fluid will flow through passage 136 to the lower end of bore 131 and apply pressure to the lower end of spool 132. This application of pressure will effect the elevation of the spool until the groove 133 therein establishes communication between passage 147 and passage 148 at which time the fluid under pump pressure may flow from passage 147 through passages 148, 149, and 150 to chamber 58 at the lower end of the sleeve 65. Since the latter member is in its lowered position, the external annular groove 152 therein will establish communication between chamber 58 and chamber 57 so that the fluid admitted to the former will flow into the latter and through port 90 to the interior of the sleeve beneath the shuttle. The shuttle will then be elevated to discontinue the supply of fluid under pump pressure to the lower end of the power cylinder 24 and direct it to the upper end thereof. The direction of movement of the piston and ram will then be reversed and the ram will apply a second thrust to the work at the full tonnage for which the relief valve 22 has been set.

The length of travel of the ram during the short reciprocations may be determined by the adjustment of the knob 155 to cause needle valve 153 to vary the flow between passage 139 and chamber 142. By varying this communication, the rate of fluid flow from the bore 131 to tank 26 may be controlled, as will also the rate of upward movement of the spool 132. Since the ram moves upwardly during the upward movement of the spool 132, the length of time the spool consumes in moving to the position establishing communication between passage 147 and 148, will determine the distance the ram moves upwardly during the short reciprocations. It will thus be seen that by adjusting the needle valve 153 to restrict this communication, the distance traveled upwardly by the ram will be increased. As long as the spool 160 permits communication between passage 63 and passage 147, the short reciprocations of the ram will be repeated. To interrupt the short stroke operation, fluid is pumped into the bore 146 to move the spool 160 downwardly until communication between bore 63 and passage 147 is interrupted. This fluid is pumped by piston 166 moving upwardly in bore 167. On each upward stroke of the ram 33, the fluid under pump pressure is supplied to the lower end of bore 167 through line 135A. This fluid causes piston 166 to move upwardly and force fluid from the upper end of the bore 167, past check valve 172 and through line 170 to the upper end of bore 146. Since line 188 leading from this bore to the return line 84 is blocked by check valve 184, the fluid thus introduced into the bore 146 will force spool 160 downward step by step against the action of the spring 161. When the spool 160 interrupts communication between passages 63 and 147, the flow of fluid under pump pressure to the underside of shuttle 71 will be discontinued and the shuttle will remain in its lowered position until the ram has completed its upward movement. The spool 160 is shown in Fig. 6 in its lowered position wherein communication between the passages 63 and 147 is interrupted and the mechanism for creating or causing the short stroke operation thus rendered inoperative. It should be obvious from the foregoing that the mechanism for producing the short reciprocation of the ram and the mechanism for determining the number of short strokes will function whether the spool 74 is in position to effect a single cycle of operation of the ram or the automatic repetition of such cycle.

Figure 18:
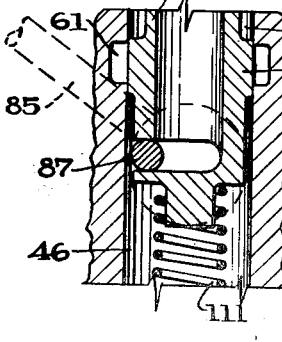
Fig. 18 is a vertical sectional view taken through the manual control spool employed in the mechanism on the plane indicated by the line XVIII—XVIII of Fig. 17.

In some adaptations of the mechanism the operation of the ram is made to depend upon the operation of a movable element of another machine or an attachment for the press or it may be controlled by the operator's foot. In Fig. 28 there has been shown diagrammatically a control circuit for hydraulically effecting such operation of a ram, this operation being dependent upon the condition of another element, such, for example, as an indexing table. In Fig. 28, the valve mechanism 23 has been shown in side elevation. A line 200 has been extended from a port 201 which, as disclosed in Fig. 3, is normally closed by a plug 202. The line 200 extends to the inlet of a three-way valve 203, one outlet of which is connected by a line 212 with the reservoir 26. The line 212 contains a control valve 213 of the self-centering four-way or other suitable type. When the self-centering four-way of the type illustrated is employed and it is in normal inactive condition it will have no appreciable effect on the fluid flowing through line 212. The other outlet of valve 203 is connected by a line 204 to a port 205 of control body 44 which port is closed as shown in Fig. 11 by a plug 206 when the control mechanism is used without the supplemental controls shown in Fig. 28. When the modified mechanism is employed, spool 74 is replaced by a slightly modified spool in which the portion 76 is made of such length that chamber 61 will at no time be in communcation with bore 73 or chamber 60. When the valve mechanism is so modified, the operation of the ram can then be initiated only through the actuation of the three-way valve 203. This valve contains a spool 207 which is normally positioned to direct fluid supplied to the valve, to the line leading to the reservoir 26. When this valve is actuated either by a moving part of a machine or manually, the line 200 will be connected with the line 204. This line extends by way of port 205 to chamber 57 and when fluid under pressure is admitted thereto, the pressure will be transmitted by way of ports 90 to the interior of the sleeve 65 to effect the elevation of the shuttle 71. This operation will direct fluid under pressure to the upper end of the power cylinder and the cycle of operation will be initiated as previously described. In the meantime, the actuating element of valve 203 may be released to permit the spool 207 to return to the position shown in Fig. 28 where fluid under pressure applied to the inlet of the valve will be vented to the tank. At the completion of the cycle of operation, the ram will come to rest at the top of its stroke and remain poised for another cycle of operation. As in the previous cycle, the valve 203 must be operated to effect the initiation of each subsequent cycle. The operation of the ram may thus be made to depend upon the movement of another machine element even though the control mechanism be automatically operated. In some instances it may be found desirable for the operator to actuate the control mechanism with his foot. To do so, a foot lever or treadle may be provided to actuate the valve 203 which will function in the manner above described. When continuous operation is found desirable, the valve 203 may be held in condition to connect lines 200 and 204, thus directing pressure fluid to the under side of the shuttle each time the sleeve 65 is moved to its upper position. Fig. 18 also includes a supplemental system 214, including the four-way valve 213 which utilizes the fluid exhausted from the three-way valve 203 to perform useful work when the ram or other fluid motor operated tool governed by the mechanism 23, is in idle condition. The system 214 is illustrated as having a reversible fluid motor 215 of the piston and cylinder type and a pair of fluid lines 216 and 217 connecting the ends of the cylinder of the motor 215 with the cylinder ports of the valve 213. With such a system, operations such as ejecting formed pieces from dies, may be performed in sequence with the operations of another mechanism. In the system shown in Fig. 28, the mechanisms governed by the controls 23 and 213 are so inter-related that neither can be operated when the other is in operation, the valve 203 directing fluid first to one control then the other and not to both simultaneously. When the element controlled by the mechanism 23 is performing a power stroke fluid flow to the valve 203 is interrupted by the shifting of valve sleeve 65; this flow is resumed at the termination of the return stroke of the element when the sleeve 65 is shifted back to its normal position.

Foot control of the mechanism may also be secured, as indicated in Fig. 27, by extending a motion transmitting connection 209 from the lower end of control spool 74 to a foot lever 210 arranged within reach of the operator. With such a mechanism, the operator may initiate the cycles of operation in the same manner as with the handle 85, continuous operation being effected by holding the lever 210 depressed.

Figs. 29, 30, and 31 show graphs on which curves are drawn to represent movements of a machine element, such as the ram 33, in relation to the time consumed in making such movements. In Fig. 29, curve A shows a plain reciprocation of the ram. This curve includes a power stroke section B and a return section C, the speed of the ram being uniform during each stroke. By setting the spool 74, through the operation of the handle 85, the ram may be caused to repeat the movement for any period of time desirable. It should be obvious that the length of stroke will be determined by the positions of the upper collar 38 on the shipper rod and the position and compressibility of the article being operated upon.

By adjusting the flow control knob 124, the ram may be caused to move in the manner represented by curve D in Fig. 30, in which the portion representing the power stroke is divided into the fast traverse section E and the pressing section F, the ram moving at a slower rate during the latter section. The return section C is the same as in the curve shown in Fig. 29. As before, the ram may be caused to automatically repeat this type of two speed reciprocation by placing the control handle 85 in the position shown in Fig. 22 and described above.

Fig. 31 contains a curve G representing the movement of the ram when the mechanism shown at 130 and 158 are in operation. The curve G includes the sections E and F representing the fast traverse portion and the pressing portion, respectively, of the power stroke. When the mechanism 130 is in operation, the return movement of ram is interrupted one or more times and the ram is caused to execute one or more short power or pressing strokes. In the curve G, the latter pressing strokes are designated by the letter H while the interrupted return strokes are designated by the letter J. When the short stroke operation is terminated by the mechanism 158, the ram makes its full return stroke C.

It is important to note that, if the material engaged by the ram is compressible, the ram will follow the compressed material and impart a pressing thrust thereto at the full force for which the relief valve 22 has been set. Through the adjustment of knob 155, the length of the short strokes may be varied to meet the operating requirements. The number of short strokes performed may be changed through the adjustment of the knob 164. As previously mentioned this knob may be set to prevent the execution of short strokes or the performance of from one to the maximum number for which the apparatus has been designed.

It should be obvious that the short stroke operation may be secured either with or without the use of the flow control mechanism and that the cycle may be automatically repeated if desired by setting the handle 85 to the position shown in Fig. 22.

Figure 16:
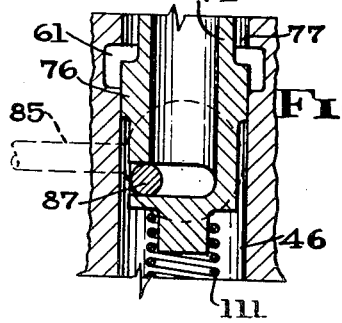
Fig. 16 is a detailed sectional view taken on the plane indicated by the line XVI—XVI of Fig. 15 and shows the position of the operating element necessary to place the control parts in the position shown in Fig. 15. The normal position of this operating element is shown by dotted lines in Fig. 4.

When the ram is to be used to perform a hold-down operation, the handle 85 must be moved to the position indicated in Fig. 16 to initiate ram operation and then moved back to that indicated in Fig. 26. The ram will make the power stroke as indicated by the dotted section K of the curve in Fig. 29, for the time period desired. By returning the handle 85 to the position indicated in Figs. 4 and 18 the ram will be caused to make the return stroke as indicated by the curve section C in Fig. 29.

In actual practice, the piston 25 in the power cylinder 24 normally stops in spaced relation from the upper end of the cylinder 24. To prevent this piston from creeping upward and injuring the mechanism after completing a return stroke, the sleeve 65 is provided with an angular port 69 which communicates with one port 93 normally registering, when the sleeve 65 is in its raised position, with cavity 52 which is connected with the lower portion of cylinder 24 by line 32. In the event pressure fluid seeps into cavity 52 it will be immediately exhausted to tank 26 through port 69, angular ports 96, cavity 55, passages 97 and 98, ports 103, passage 104, port 105, chamber 106 and line 84, and pressure will be precluded from building up in the cylinder 24 beneath piston 25.

While the form of embodiment of the present invention as herein disclosed constitutes a preferred form, it is to be understood that other forms might be adopted, all coming within the scope of the claims which follow.

I claim:

1. In a hydraulic system, a source of fluid pressure; a fluid motor capable of forward and reverse operation; means for controlling the operation of said motor comprising a flow-directing valve means operative to alternately direct fluid from said source to different portions of said motor to cause forward and reverse operations thereof, said valve means being responsive to the application of fluid pressure thereto to assume a position to direct fluid to said motor to cause forward operation; means operative upon the relieving of fluid pressure from said valve means to cause the same to assume a second position to direct fluid to said motor to cause reverse operation thereof; and a second valve means responsive to fluid pressure during initial reverse operation of said motor irrespective of the extent of forward operation thereof to apply fluid pressure to said first valve means to move the same to the position to cause forward operation of said motor.

2. In a hydraulic system, a source of fluid pressure; a fluid motor capable of forward and reverse operation; means for controlling the operation of said motor comprising a flow-directing valve means operative to alternately direct fluid from said source to different portions of said motor to cause forward and reverse operations thereof, said valve means being responsive to the application of fluid pressure thereto to assume a position to direct fluid to said motor to cause forward operation; means operative upon the relieving of fluid pressure from said valve means to cause the same to assume a second position to direct fluid to said motor to cause reverse operation thereof; a second valve means responsive to fluid pressure during initial reverse operation of said motor irrespective of the extent of forward operation thereof to apply fluid pressure to said first valve means to return the same to the position to cause forward operation of said motor; and means for varying the responsiveness of said second valve means to fluid pressure.

3. In a hydraulic system, a source of fluid pressure; a fluid motor capable of forward and reverse operation; means for controlling the operation of said motor comprising a flow-directing valve means operative to alternately direct fluid from said source to different portions of said motor to cause forward and reverse operations thereof, said valve means being responsive to the application of fluid pressure thereto to assume a position to direct fluid to said motor to cause forward operation, the relieving of fluid pressure from said valve means causing the same to assume a second position to direct fluid to said motor to cause reverse operation thereof; manually operated means for initiating the operation of said flow-directing valve means; a second valve means responsive to fluid pressure following initial reverse operation of said motor to apply fluid pressure to said first valve means to return the same to the position to cause forward operation of said motor; and means for rendering said second means ineffective after a predetermined number of operations thereof.

4. In a hydraulic system, a source of fluid pressure; a power cylinder having a reciprocating piston; means for controlling the operation of said piston comprising flow-directing valve means responsive to fluid pressure to direct fluid to one side of said piston to cause forward movement thereof, said valve means being responsive to absence of fluid pressure to direct fluid to the other side of said piston to cause reverse movement; manually operated means for initiating the application of fluid pressure to said flow-directing valve means to cause forward movement of said piston; a second valve means responsive to fluid pressure following initial reverse movement of said piston to apply fluid pressure to said first valve means to return the same to the position to cause forward movement of said piston; means for varying the responsiveness of said second valve means to fluid pressure; and means for rendering said second valve means ineffective after a predetermined number of operations thereof.

5. In a hydraulic system, a source of fluid pressure; a power cylinder having a reciprocating piston; means for controlling the operation of said piston comprising flow-directing valve means responsive to fluid pressure to direct fluid to one side of said piston to cause forward movement thereof, said valve means being responsive to absence of fluid pressure to direct fluid to the other side of said piston to cause reverse movement; manually operated means for initiating the application of fluid pressure to said flow-directing valve means to cause forward movement of said piston; a second valve means responsive to fluid pressure following initial reverse movement of said piston to apply fluid pressure to said first valve means to return the same to the position to cause forward movement of said piston; means for rendering said second valve means ineffective after a predetermined number of operations thereof; and means for adjusting said last-named means to vary the number of operations performed by said second valve means.

6. In a hydraulic system, a source of fluid pressure; a power cylinder having a reciprocating piston; means for controlling the operation of said piston comprising flow-directing valve means responsive to fluid pressure to direct fluid to one side of said piston to cause forward movement thereof, said valve means being responsive to absence of fluid pressure to direct fluid to the other side of said piston to cause reverse movement; manually operated means for initiating the application of fluid pressure to said flow-directing valve means to cause forward movement of said piston; a second valve means responsive to fluid pressure following initial reverse movement of said piston to apply fluid pressure to said first valve means to return the same to the position to cause forward movement of said piston; means for varying the responsiveness of said second valve means to fluid pressure; means for rendering said second valve means ineffective after a predetermined number of operations thereof; and means for adjusting said last-named means to vary the number of operations performed by said second valve means.

7. In a hydraulic system, a source of fluid pressure; a power unit having a reciprocating piston; means alternately directing fluid from said source to opposite sides of said piston to effect the reciprocation thereof; a second means operated solely by fluid pressure from said source when said piston is moving in one direction to cause said fluid directing means to reverse the direction of movement of said piston before the completion of a full stroke to cause shorter reciprocations thereof; and, fluid pressure operated means for rendering said second means inoperative after the execution of a predetermined number of said shorter reciprocations.

8. In a hydraulic system, a source of fluid pressure; a power unit having a reciprocating piston; means alternately directing fluid flow from said source to opposite sides of said piston to effect the reciprocation thereof; means for resisting the flow of exhaust fluid from said power unit when said piston is moving in one direction to create back pressure, said first mentioned means having a flow directing member operated by said back pressure to direct fluid from said source to said unit to move said piston in a certain direction; and, means for controlling the rate of movement of said piston while moving in said direction, said means having a member responsive to said back pressure to by-pass a portion of fluid pressure from said source around said power unit, the degree of responsiveness to back pressure of said flow directing member and said by-passing means being different.

9. In a machine tool of the type having an element disposed for reciprocatory movement; a source of fluid under pressure; flow directing means operative to alternately apply fluid from said source to different portions of said element to effect reciprocation thereof, said flow-directing means having a valve member operative in a first position to apply fluid to said element to cause movement thereof in a forward direction and in a second position to apply fluid to said element to cause movement thereof in a reverse direction; means for moving said valve member from the first to the second position when said element exerts a predetermined force in said forward direction; and a second valve member operated by fluid pressure controlled by said first-mentioned valve member when in said second position to apply fluid pressure from said source to said first-mentioned valve member to return the same to said first position.

10. In a machine tool of the type having an element disposed for reciprocatory movement; a source of fluid under pressure; flow directing means operative to alternately apply fluid from said source to different portions of said element to effect reciprocation thereof, said flow-directing means having a valve member operative in a first position to apply fluid to said element to cause movement thereof in a forward direction and in a second position to apply fluid to said element to cause movement thereof in a reverse direction; means for moving said valve member from the first to the second position when said element exerts a predetermined force in said forward direction; a second valve member operated by fluid pressure controlled by said first-mentioned valve member when in said second position to apply fluid pressure from said source to said first-mentioned valve member to return the same to said first position; and means for controlling the rate of response of said second valve member to fluid pressure.

11. In a machine tool of the type having an element disposed for reciprocatory movement; a source of fluid under pressure; flow directing means operative to alternately apply fluid from said source to different portions of said element to effect reciprocation thereof, said flow-directing means having a valve member operative in a first position to apply fluid to said element to cause movement thereof in a forward direction and in a second position to apply fluid to said element to cause movement thereof in a reverse direction; means for moving said valve member from the first to the second position when said element exerts a predetermined force in said forward direction; a second valve member operated by fluid pressure controlled by said first-mentioned valve member when in said second position to apply fluid pressure from said source to said first-mentioned valve member to return the same to said first position; and a third valve member for rendering said second valve member ineffective after a predetermined number of operations thereof, said third valve member being advanced a predetermined distance toward operative position simultaneously with each operation of said second valve member.

12. In a machine tool of the type having an element disposed for reciprocatory movement; a source of fluid under pressure; flow directing means operative to alternately apply fluid from said source to different portions of said element to effect reciprocation thereof, said flow-directing means having a valve member operative in a first position to apply fluid to said element to cause movement thereof in a forward direction and in a second position to apply fluid to said element to cause movement thereof in a reverse direction; means for moving said valve member from the first to the second position when said element exerts a predetermined force in said forward direction; a second valve member operated by fluid pressure controlled by said first-mentioned valve member when in said second position to apply fluid pressure from said source to said first-mentioned valve member to return the same to said first position; a third valve member for rendering said second valve member ineffective after a predetermined number of operations thereof, said third valve member being advanced a predetermined distance toward operative position simultaneously with each operation of said second valve member; and means for controlling said third valve member to regulate the number of operations of said second valve member.

13. In a hydraulic system, a source of fluid pressure, a reversible fluid motor; means for directing fluid from said pressure source to said motor to alternately operate the same in forward and reverse directions, said means having a flow directing member and a valving member movable relative to one another in response to fluid pressure to cause the operation of said motor in a predetermined direction, said means having a third member relative to which said flow directing and valving members are relatively movable as a unit; and valve means operative when said flow-directing and valving members are in a predetermined position relative to said third member to apply fluid from said pressure source to said flow directing member to move the same relative to said valving member.

14. In a hydraulic system, a source of fluid pressure; a reversible fluid motor; means for controlling the flow of fluid from said source to said motor to govern the direction of operation, said means having a flow directing member responsive to fluid pressure to cause the operation of said motor in a predetermined direction; means operative to selectively start and stop the application of fluid pressure to said flow-directing member; and a second means controlled by the operation of an element which is operable independently of said hydraulic system to direct fluid from said pressure source to said flow-directing member to initiate the operation of said motor, said second means being operative only when said motor is idle in a starting position.

15. In a hydraulic system, means for generating fluid pressure; a reversible fluid motor; means for controlling the admission of fluid pressure to said motor to cause forward and reverse operation thereof, said means having a primary valve member and a flow-directing member responsive to fluid pressure to cause the operation of said motor in a predetermined direction; and a second valve means separate from said control means, said valve means receiving fluid under control of said primary valve member from said pressure source and selectively directing fluid either back to said control means for application to said flow-directing member or to exhaust.

16. In a hydraulic system, a source of fluid pressure; a reversible fluid motor; means for controlling the admission of fluid pressure to said motor to cause forward and reverse operation thereof, said means having a flow-directing member responsive to fluid pressure to cause the operation of said motor in a predetermined direction; means operative when said motor exerts a predetermined force in said predetermined direction to move said flow-directing member to a position to cause reverse operation of said motor; and fluid pressure operated valve means operative to apply fluid pressure from said source to said flow-directing member to initiate operation of said motor in said predetermined direction, said valve means being operative only when said flow-directing member is disposed to cause operation of said motor in the direction opposed to said predetermined direction.

17. In a hydraulic system, a source of fluid pressure; a reversible fluid motor; means for controlling the admission of fluid pressure to said motor to cause forward and reverse operation thereof, said means having a flow-directing member responsive to fluid pressure to cause the operation of said motor in a predetermined direction; means for resisting exhaust flow from said motor during operation thereof in said predetermined direction to create back pressure; means for applying said back pressure to said flow-directing member to cause motor operation in said predetermined direction; and fluid pressure operated valve means operative to apply fluid pressure from said source to said flow-directing member to initiate operation of said motor in said predetermined direction, said valve means being operative when said flow-directing member is disposed to cause operation of said motor in the direction opposite said predetermined direction.

18. In a hydraulic system, a source of fluid pressure; a reversible fluid motor; means for controlling the admission of fluid pressure to said motor to cause forward and reverse operation thereof, said means having a flow-directing member responsive to fluid pressure to cause the operation of said motor in a predetermined direction; means for resisting exhaust flow from said motor during operation thereof in said predetermined direction to create back pressure; means for applying said back pressure to said flow-directing member to cause motor operation in said predetermined direction; fluid pressure operated valve means operative to apply fluid pressure from said source to said flow-directing member to initiate operation of said motor in said predetermined direction, said valve means being operative when said flow-directing member is disposed to cause operation of said motor in the direction opposite said predetermined direction; and means for retarding the response of said fluid pressure operated valve means.

19. In a hydraulic system, a source of fluid pressure; a reversible fluid motor; means for controlling the admission of fluid pressure to said motor to cause forward and reverse operation thereof, said means having a flow-directing member responsive to fluid pressure to cause the operation of said motor in a predetermined direction; means for resisting exhaust flow from said motor during operation thereof in said predetermined direction to create back pressure; means for applying said back pressure to said flow-directing member to cause motor operation in said predetermined direction; fluid pressure operated valve means operative to apply fluid pressure from said source to said flow-directing member to initiate operation of said motor in said predetermined direction, said valve means being operative when said flow-directing member is disposed to cause operation of said motor in the direction opposite predetermined direction; and means for varying the length of time required by said fluid pressure operated valve means to respond to fluid pressure.

20. In a hydraulic system, a source of fluid pressure; a reversible fluid motor; means for controlling the admission of fluid pressure to said motor to cause forward and reverse operation thereof, said means having a flow-directing member responsive to fluid pressure to cause the operation of said motor in a predetermined direction; means for resisting exhaust flow from said motor during operation thereof in said predetermined direction to create back pressure; means for applying said back pressure to said flow-directing member to cause motor operation in said predetermined direction; fluid pressure operated valve means operative to apply fluid pressure from said source to said flow-directing member to initiate operation of said motor in said predetermined direction, said valve means being operative when said flow-directing member is disposed to cause operation of said motor in the direction opposite said predetermined direction; and means rendering said fluid pressure operated valve means ineffective after a predetermined number of operations thereof.

21. In a hydraulic system, a source of fluid pressure; a power cylinder having a reciprocating piston; means for controlling the admission of fluid pressure to said power cylinder to cause the reciprocation of said piston, said means having a flow-directing member responsive to fluid pressure to cause movement of said piston in a predetermined direction; valve means responsive to the application of fluid pressure thereto to apply fluid pressure from said source to said flow-directing member to initiate movement of said piston in a predetermined direction; means operative when said piston is moving in a direction opposed to the predetermined direction to apply fluid pressure to said valve means; means rendering said valve means ineffective after a predetermined number of operations thereof; and means operated by said piston adjacent the termination of its stroke in the opposite direction for setting said last-named means for a subsequent operation.

22. In a hydraulic system, a source of fluid pressure; a reversible fluid motor; means for controlling the operation of said motor comprising a unit having elements movable to different relative positions to cause forward and reverse operation of said motor; means for utilizing fluid pressure to place said elements in one relation to cause forward operation of said motor; means responsive to fluid pressure when said motor is operating in a forward direction to prevent the operation of said fluid pressure utilizing means; and means for disposing said elements in a second relative position to cause reverse operation of said motor when the latter exerts a predetermined force in a forward direction.

23. In a hydraulic system, a source of fluid pressure; a reversible fluid motor; means for controlling the operation of said motor comprising a unit having elements movable to different relative positions to provide forward and reverse operation and idle periods of said motor; means for utilizing fluid pressure to move said elements from the relation causing the motor to remain idle to a second relation causing forward operation of said motor; means responsive to fluid pressure when said elements are in the second relation to render said fluid pressure utilizing means ineffective; means for utilizing fluid exhausted from said motor while in forward operation to maintain said elements in said second relation, and means for disposing said elements in a third relation to cause reverse operation of said motor when the latter exerts a predetermined force in the forward direction.

24. In a hydraulic system, a reversible fluid motor; a source of fluid pressure; means controlling the flow of fluid from said source to said motor to govern the operation thereof comprising casing means; valve means disposed for movement in said casing means, said valve means directing fluid from said source to said motor to cause reverse operation when in one position and forward operation when in a second position; means for applying fluid from said pressure source to said valve means to move the same from said one position to said second position; means operative when said valve means is in said second position to utilize fluid from said source to render said fluid applying means inoperative; and, means for returning said valve means to said one position when said motor exerts a predetermined force in its forward operation.

25. In a hydraulic system, a reversible fluid motor; a source of fluid pressure; means controlling the flow of fluid from said source to said motor to govern the operation thereof comprising casing means; valve means disposed for movement in said casing means, said valve means directing fluid from said source to said motor to cause reverse operation when in one position and forward operation when in a second position; means for applying fluid from said pressure source to said valve means to move the same from said one position to said second position; means operative when said valve means is in said second position to utilize fluid from said source to render said fluid applying means inoperative; means for controlling the flow of fluid from said source to said fluid utilizing means to regulate the period of operability thereof, and, means for returning said valve means to said one position when said motor exerts a predetermined force in its forward operation.

CECIL E. ADAMS.

REFERENCES CITED

The following references are of record in the file of this patent:

UNITED STATES PATENTS

| Number | Name | Date |
|---|---|---|
| 1,779,586 | Chalker | Oct. 28, 1930 |
| 1,875,623 | Longbotham | Sept. 6, 1932 |
| 1,911,132 | Macomber | May 23, 1933 |
| 1,952,690 | Strom | Mar. 27, 1934 |
| 2,028,766 | Ernst | Jan. 28, 1936 |
| 2,058,063 | Cox | Oct. 20, 1936 |
| 2,079,640 | Vickers | May 11, 1937 |
| 2,102,865 | Vickers | Dec. 21, 1937 |
| 2,169,470 | Miller | Aug. 15, 1939 |
| 2,247,479 | Caldwell | July 1, 1941 |
| 2,253,617 | Griffin | Aug. 26, 1941 |
| 2,349,916 | Stacy | May 30, 1944 |
| 2,367,242 | Stacy | Jan. 16, 1945 |
| 2,386,184 | Balsiger | Oct. 9, 1945 |